(12) United States Patent
Jin et al.

(10) Patent No.: US 8,913,101 B2
(45) Date of Patent: Dec. 16, 2014

(54) METHOD, SYSTEM, TERMINAL, AND SERVER FOR TRANSFERRING VIDEO CALL BETWEEN ACCESS NETWORKS

(71) Applicant: Huawei Device Co., Ltd., Shenzhen, Guangdong (CN)

(72) Inventors: Hui Jin, Beijing (CN); Xiaoyan Duan, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 139 days.

(21) Appl. No.: 13/731,411

(22) Filed: Dec. 31, 2012

(65) Prior Publication Data
US 2013/0120519 A1    May 16, 2013

Related U.S. Application Data

(63) Continuation of application No. PCT/CN2011/078318, filed on Aug. 12, 2011.

(30) Foreign Application Priority Data

Aug. 12, 2010  (CN) .......................... 2010 1 0253436

(51) Int. Cl.
  *H04N 7/14*  (2006.01)
  *H04W 36/00*  (2009.01)
  *H04L 29/06*  (2006.01)

(52) U.S. Cl.
  CPC ........... *H04N 7/141* (2013.01); *H04W 36/0022* (2013.01); *H04L 65/1016* (2013.01); *H04L 65/1069* (2013.01); *H04L 65/1083* (2013.01)
  USPC .................. 348/14.02; 348/14.01; 348/14.12; 370/352

(58) Field of Classification Search
  CPC .... H04W 36/0022; H04N 7/141; H04N 7/14; H04N 7/143; H04N 7/147; H04N 7/148; H04N 7/15; H04N 7/152; H04L 65/1016; H04L 65/1083; H04L 65/1069
  USPC ...................... 348/14.01–14.16; 370/352, 355
  See application file for complete search history.

(56) References Cited

U.S. PATENT DOCUMENTS

| 2010/0240344 | A1 | 9/2010 | Jin et al. |
| 2011/0051722 | A1 | 3/2011 | Jin |
| 2012/0327892 | A1 | 12/2012 | Wenger et al. |

FOREIGN PATENT DOCUMENTS

| CN | 101351039 A | 1/2009 |
| CN | 101416480 A | 4/2009 |

(Continued)

OTHER PUBLICATIONS

"3rd Generation Partnership Project; Technical Specification Group Services and System Aspects; Feasibility Study of Single Radio Video call Continuity (vSRVCC); Stage 2 (Relase 10)", 3GPP Standard; 3GPP TR 23.886, No. V0.2.0, Jun. 2, 2010, pp. 1-21, XP050441492.*

(Continued)

*Primary Examiner* — Melur Ramakrishnaiah
(74) *Attorney, Agent, or Firm* — Conley Rose, P.C.; Grant Rudolph; Nicholas K. Beaulieu

(57) ABSTRACT

The present invention discloses a method, a system, a terminal, an MSC server, and an SCC application server for transferring a video call between access networks. The method includes: pre-negotiating, in a PS domain and through IMS signaling, a CS video call parameter; and, after a video call of a terminal is transferred from the PS domain to a CS domain, establishing a CS video call according to the pre-negotiated CS video call parameter. By using the technical solutions of the present invention, the CS video call parameter is pre-negotiated before the video call of the terminal is transferred from the PS domain to the CS domain, and after transfer to the CS domain, the CS video call is established by directly using the pre-negotiated CS video call parameter.

21 Claims, 13 Drawing Sheets

(56) References Cited

FOREIGN PATENT DOCUMENTS

| CN | 101453706 A | 6/2009 |
|---|---|---|
| CN | 101742589 A | 6/2010 |
| EP | 2234341 A1 | 9/2010 |
| EP | 2249537 A1 | 11/2010 |
| WO | 2008074104 A1 | 6/2008 |

OTHER PUBLICATIONS

Foreign communication from a counterpart application, PCT application PCT/CN2011/078318, English Translation International Search Report dated Nov. 24, 2011, 2 pages.

"3rd Generation Partnership Project; Technical Specification Group Services and System Aspects; Feasibility Study of Single Radio Video Call Continuity (vSRVCC); Stage 2, Release 10," 3GPP TR 23.886 V0.2.0, May 2010, 21 pages.

Foreign Communications From a Counterpart Application, PCT Application PCT/CN2011/078318, International Search Report, dated Aug. 12, 2010, 13 pages.

Foreign Communication From a Counterpart Application, European Application No. 11816113.2, Extended European Search Report dated Dec. 18, 2013, 7 pages.

NTT Docomo: "3G-324M Pre-Negotiation Scheme for vSRVCC Domain Transfer", 3GPP TSG SA WG2 Meeting #79, Kyoto, Japan, S2-102962, XP050435049, May 10-17, 2010, 3 pages.

"3rd Generation Partnership Project; Technical Specification Group Services and System Aspects; Feasibility Study of Single Radio Video Call Continuity (vSRVCC); Stage 2 (Release 10)", 3GPP Standard, 3GPP TR 23.886, V0.2.0, XP050441492, Jun. 2, 2010, 21 pages.

Foreign Communication From a Counterpart Application, Chinese Application No. 201010253436.3, Chinese Office Action dated Jul. 3, 2013, 9 pages.

Foreign Communication From a Counterpart Application, Chinese Application No. 201010253436.3, Partial Translation of Chinese Office Action dated Jul. 3, 2013, 8 pages.

Foreign Communication From a Counterpart Application, PCT Application PCT/CN2011/078318, English Translation of Written Opinion dated Nov. 24, 2011, 15 pages.

Foreign Communication From a Counterpart Application, European Application No. 11816113.2, European Office Action dated Aug. 6, 2014, 4 pages.

* cited by examiner

METHOD, SYSTEM, TERMINAL, AND SERVER FOR TRANSFERRING VIDEO CALL BETWEEN ACCESS NETWORKS

CROSS-REFERENCE TO RELATED APPLICATIONS

This application is a continuation of International Application No. PCT/CN2011/078318, filed on Aug. 12, 2011, which claims priority to Chinese Patent Application No. 201010253436.3, filed on Aug. 12, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to an Internet Protocol (IP) Multimedia Subsystem (IMS) technology, and in particular to a method, a system, a terminal, an Mobile Switching Center (MSC) server, and an Service Centralization and Continuity (SCC) application server for transferring a video call between access networks.

BACKGROUND

An IMS is a multimedia service communication network based on IP, and is regarded as a core technology that is of a next-generation communication network, supports services of a plurality of media, such as voice, video, and data, and their combinations, and implements integration of a plurality of networks (for example, mobile and fixed networks, Packet Switching (PS) and Circuit Switching (CS) networks). In an IMS network, an IMS core network subsystem is adopted for service control, and a packet switching network or a circuit switching network is used as an access network to provide a bearer signaling and media stream transmission, thereby separating a service control network from a bearer network, and providing a unified and flexible supporting platform for an IP multimedia application.

In the IMS network, a Call Session Control Function (CSCF), provides a core IMS session control function. The CSCF may be classified into a Proxy CSCF (P-CSCF), a Serving CSCF (S-CSCF), and an Interrogating CSCF (I-CSCF) according to its position and function. The P-CSCF is a first connection point with a user in the IMS, and provides a proxy function, namely, receives a service request and forwards the service request; the P-CSCF may also provide a user agent (UA) function, namely, interrupt and independently generate an Session Initial Protocol (SIP) session in an abnormal case. The S-CSCF is in a core control position on an IMS core network, is responsible for registration authentication and session control for a User Equipment (UE), executes basic session routing functions for IMS users at a calling end and a called end, and according to an IMS trigger rule subscribed by the users, performs value-added service route triggering to an Application Server (AS) and service control interaction with an AS when a condition is met. The I-CSCF is similar to a gateway node on the IMS, and provides functions such as allocation of user serving nodes in a local domain, route querying, and topology hiding between IMS domains.

An AS provides an IMS value-added service for an IMS user, and may perform service control through interaction with the S-CSCF.

The IMS adopts SIP signaling as call control signaling. SIP is an IMS control layer protocol, one of multimedia stream communication system framework protocols formulated by Internet Engineering Task Force (IETF), and an application layer protocol used to establish, change, or end a multimedia stream session, and cooperates with protocols such as Real Time Transport Protocol (RTP)/RTP Control Protocol (RTCP), Session Description Protocol (SDP), Real Time Streaming Protocol (RTSP), and Domain Name System (DNS) to jointly complete session establishment and media stream negotiation in the IMS. Once a session is established, a media stream is directly transmitted at a bearer layer by using the RTP protocol. A plurality of media streams may be flexibly interacted in one session.

In IMS Service Continuity (SC) session continuity when a user moves between different access networks is researched. That is, the user can change an access network without interrupting a session when moving. The core of the SC is an SCC AS, and the SCC AS completes a function of transferring between Access Leg in different access networks. An Access Leg is a call control path between a UE and an SCC AS. When it has been detected by an SC user equipment in a connection state that a change of a surrounding radio environment or other changes occur, the SC user equipment in the connection state performs access network transfer according to a predefined transfer policy.

A Single Radio terminal is a special type of terminal, where the terminal of this type can enable only one type of radio frequency at a certain moment. For example, when enabling a Universal Mobile Telecommunications System (UMTS) radio frequency, the UE cannot enable an Long Term Evolution (LTE) radio frequency. Transfer of a voice service of a single radio terminal between different access networks is referred to as Single Radio Voice Call Continuity (SRVCC), and transfer of a video service between different access networks is referred to as Single Radio Video Call Continuity (vSRVCC).

SCUDIF is a CS network service feature, a full name of which is Service Change and UDI Fallback feature. Unstructured Data Information (UDI) is a type of bearer capability, which enables a UE to send data at a rate of 64 kbit/s, and a typical application is a video call. A service change enables the UE to switch between a voice call and a video call during an ongoing call process without interrupting the call.

In the prior art, a major solution for transferring a video call from an IMS domain to a CS domain is to transfer voice media to the CS domain first, and then establish a new video call in the CS domain to replace the transferred voice media. In a handover process, a UE needs to first change the video call into a voice call, and then change the voice call back to a video call. Generally, the UE needs a certain period of time (for example, 5 to 8 seconds) for negotiating a video encoding manner in the CS domain. Therefore, the UE and a peer end undergo video interruption for at least a certain period of time. During the handover process, the voice media of the UE is held until CS video negotiation is completed. That is, voice communication of the UE also undergoes interruption for a certain period of time. Therefore, this solution results in communication interruption of voice and video for a certain period of time, which reduces user experience.

SUMMARY

To solve a problem in the prior art that voice and video interruption occur during a handover process of a video call of a UE from a PS domain to a CS domain, an embodiment of the present invention provides a method for transferring a video call between access networks, where the method includes pre-negotiating, in a PS domain and through IMS signaling, a CS video call parameter, to obtain the pre-negotiated CS video call parameter; and after a video call of a terminal is transferred from the PS domain to a CS domain, establishing a CS video call according to the pre-negotiated CS video call parameter.

Another embodiment of the present invention provides a terminal, including a parameter sending module, configured to, when a video call of a terminal is in a PS domain, send, through IMS signaling, information that is of the terminal and is required for establishing a CS video call; a parameter receiving module, configured to, when the video call of the terminal is in the PS domain, receive a pre-negotiated CS video call parameter through the IMS signaling; and a connection establishing module, configured to, after the video call of the terminal is transferred to a CS domain, establish the CS video call for the terminal according to the pre-negotiated CS video call parameter.

Another embodiment of the present invention provides an MSC server, including a parameter pre-negotiating module, configured to: when a video call of a terminal is in a PS domain, obtain, through IMS signaling, information that is of the terminal and is required for establishing a CS video call, perform CS video call parameter pre-negotiation to obtain a pre-negotiated CS video call parameter, and send the pre-negotiated CS video call parameter to the terminal; and a connection establishing module, configured to, after the video call of the terminal is transferred to a CS domain, establish the CS video call for the terminal according to the pre-negotiated CS video call parameter.

Another embodiment of the present invention provides an application server, including a terminal parameter forwarding module, configured to obtain, through IMS signaling, information that is of a terminal and is required for establishing a CS video call, and forward the information to an MSC server; and a pre-negotiated parameter forwarding module, configured to receive, through the IMS signaling, a pre-negotiated CS video call parameter from the MSC server, and forward the pre-negotiated CS video call parameter to the terminal.

The present invention further provides an IMS system, including the foregoing terminal, MSC server, or application server.

In the method, terminal, MSC server, application server, and system provided by the present invention, negotiation of the CS video call parameter is performed in advance, and after the video call of the terminal is transferred from the PS domain to the CS domain, a CS video call connection is established by directly using the pre-negotiated CS video call parameter, which avoids the problem of voice and video interruption in the prior art.

DETAILED DESCRIPTION

The present invention is described more comprehensively in the following with reference to accompanying drawings, where exemplary embodiments of the present invention are illustrated. In the accompanying drawings, same marks indicate same or similar components or elements.

Figure 1:
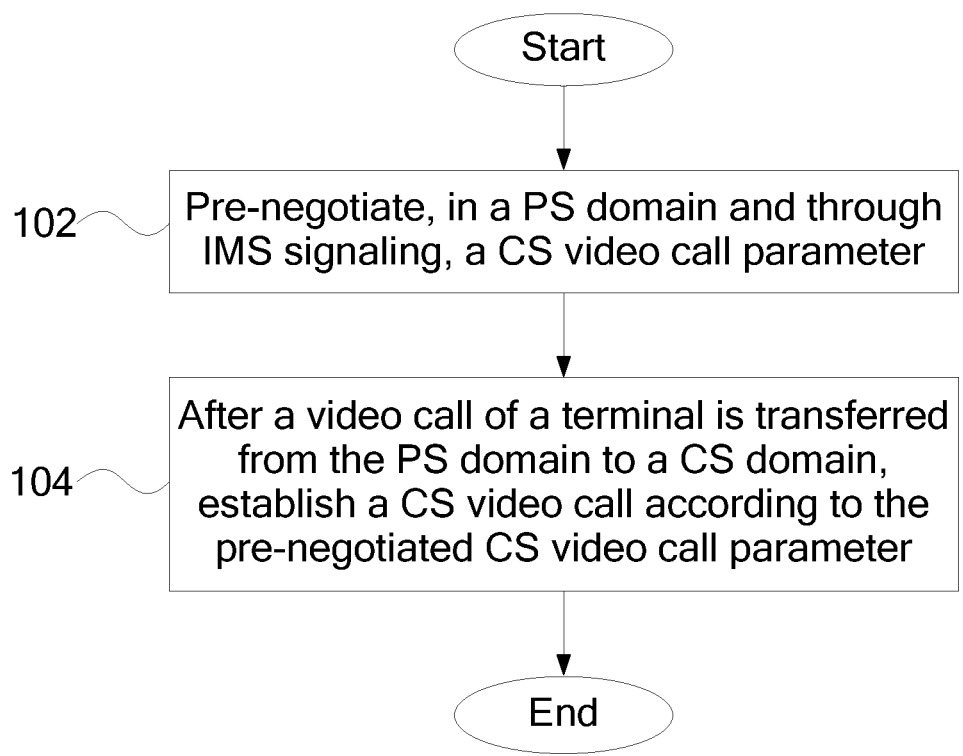
FIG. 1 is a flowchart of an embodiment of a method for transferring a video call between access networks according to the present invention.

FIG. 1 is a flowchart of an embodiment of a method for transferring a video call between access networks according to the present invention.

As shown in FIG. 1, in step 102, a CS video call parameter is pre-negotiated through IMS signaling in a PS domain to obtain the pre-negotiated CS video call parameter. For example, when a CS video call is established by adopting the 3G-324M technology/standard, the CS video call parameter here includes: (1) H.223 Multiplexer level detection; (2) Terminal Capability Exchange; (3) Master Slave determination; (4) Open Logical Channels; and (5) Multiplexer Table Entries Exchange. Optionally, the following may be further included: (6) Whether a UE or a network supports an SCUDIF. Negotiation time includes a plurality of manners that negotiation of the CS video call parameter is performed during a video call establishment process of a terminal, that negotiation of the CS video call parameter is performed after establishment of a video call of a terminal, or that negotiation of the CS video call parameter is performed in a handover transfer process, and so on.

In step 104, after a video call of a terminal is transferred from the PS domain to a CS domain, a CS video call is established according to the pre-negotiated CS video call parameter. The terminal and a network side directly use the parameter to establish the CS video call.

In this embodiment, the CS video call parameter is pre-negotiated before the video call of the terminal is transferred from the PS domain to the CS domain, and after the transfer to the CS domain, the CS video call is established by directly using the pre-negotiated CS video call parameter, which avoids voice and video interruption caused by the negotiation of the CS video call parameter during a handover process of the video call of the UE from the PS domain to the CS domain, and improves user experience.

A plurality of implementation manners of the present invention are illustrated below through various specific embodiments.

Figure 2:
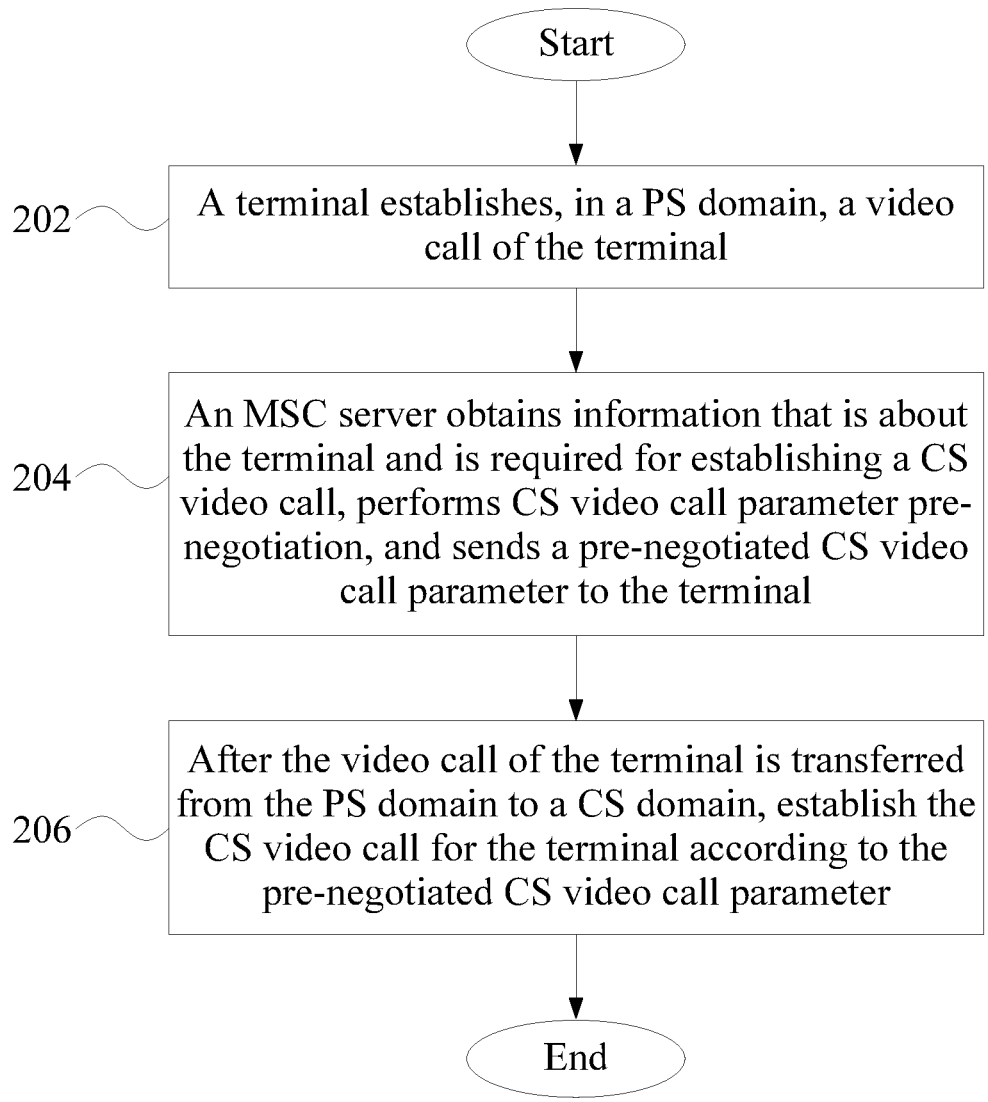
FIG. 2 is a flowchart of another embodiment of a method for transferring a video call between access networks according to the present invention.

FIG. 2 is a flowchart of another embodiment of a method for transferring a video call between access networks according to the present invention.

As shown in FIG. 2, in step 202, a terminal establishes, in a PS domain, a video call of the terminal, namely, an IMS video call of the terminal. For example, an IMS video call establishment process of the terminal is initiated by an IMS video call establishment request message sent by the terminal. The terminal carries, in the request message for initiating IMS video call establishment (e.g. Invite message), an indication that the terminal supports vSRVCC pre-negotiation, The terminal receives an acknowledgement that a network side supports the vSRVCC pre-negotiation, and establishes the IMS video call in the PS domain. In an embodiment of the present invention, the terminal may not need to receive the acknowledgement that the network side supports the vSRVCC pre-negotiation.

In step 204, an MSC server obtains information that is of the terminal and is required for establishing a CS video call. For example, when the CS video call is established by adopting the 3G-324M technology/standard, the information that is of the terminal and is required for establishing the CS video call includes: (1) H.223 Multiplexer level detection; (2) Terminal Capability Exchange; (3) Master Slave determination (4) Open Logical Channels; and (5) Multiplexer Table Entries Exchange. Optionally, the following may be further included: (6) Whether a UE or a network supports an SCUDIF.

The MSC server performs CS video call parameter pre-negotiation according to the information that is of the terminal and is required for establishing the CS video call, to obtain a pre-negotiated CS video call parameter, and sends the pre-negotiated CS video call parameter to the terminal. For example, based on the indication of supporting the vSRVCC pre-negotiation in the Invite message, after the terminal establishes the IMS video call in the PS domain, the MSC server obtains the information that is of the terminal and is required for establishing the CS video call, performs the CS video call parameter pre-negotiation to obtain the pre-negotiated CS video call parameter, and sends the pre-negotiated CS video call parameter to the terminal. Specifically, this step may be that:

after the terminal establishes the IMS video call in the PS domain, the MSC server initiatively requests, from the terminal, the information that is of the terminal and is required for establishing the CS video call, and then sends the pre-negotiated CS video call parameter to the terminal; or an SCC AS initiatively requests, from the terminal, the information that is of the terminal and is required for establishing the CS video call, and then the SCC AS sends, to the MSC server, the obtained information that is of the terminal and is required for establishing the CS video call; the MSC server sends the pre-negotiated CS video call parameter to the SCC AS, and the SCC AS sends the pre-negotiated CS video call parameter to the terminal; or the terminal initiatively sends the information that is of the terminal and is required for establishing the CS video call to the MSC server, and the MSC server sends the pre-negotiated CS video call parameter to the terminal; or the terminal initiatively sends the SCC AS the information that is of the terminal and is required for establishing the CS video call, and then the SCC AS sends, to the MSC server, the obtained information that is of the terminal and is required for establishing the CS video call; the MSC server sends the pre-negotiated CS video call parameter to the SCC AS, and the SCC AS sends the pre-negotiated CS video call parameter to the terminal.

In step 206, after the video call of the terminal is transferred from the PS domain to a CS domain, the CS video call is established for the terminal according to the pre-negotiated CS video call parameter.

In this embodiment, before the CS video call parameter pre-negotiation is performed, it is acknowledged, in advance and through the indication of the vSRVCC pre-negotiation, whether the terminal and the network side support the CS video call parameter pre-negotiation. In a case that it is acknowledged that both the terminal and the network side support the CS video call parameter pre-negotiation, the CS video call parameter pre-negotiation is performed, which makes the procedure more flexible and reasonable.

Figure 3:
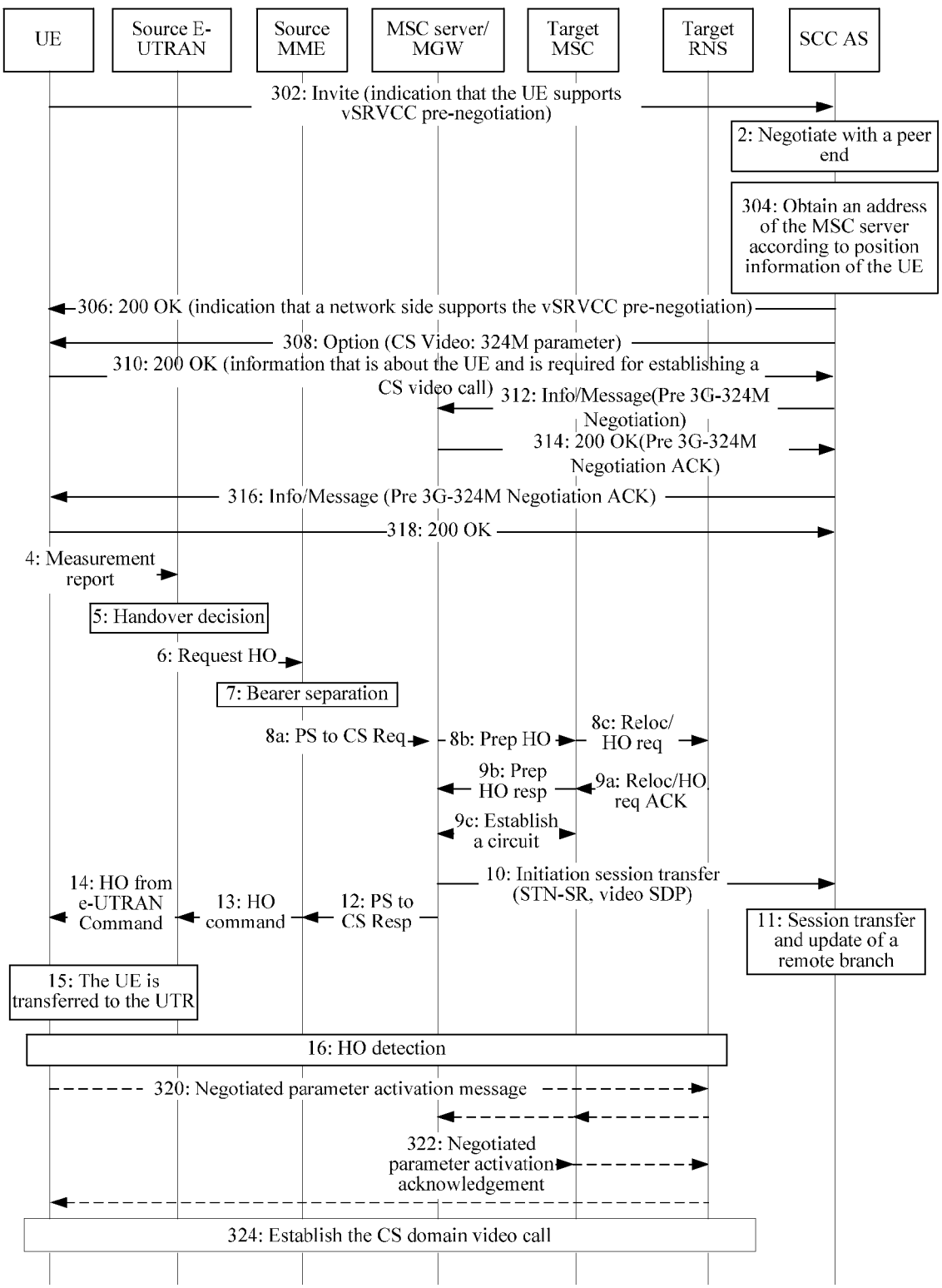
FIG. 3 is a signaling diagram of an embodiment of a method for transferring a video call between access networks according to the present invention.

FIG. 3 is a signaling diagram of an embodiment of a method for transferring a video call between access networks according to the present invention. In this embodiment, an SCC AS controls negotiation of a CS video call parameter that is performed by an MSC server and a terminal: When initiating IMS video call establishment, a UE carries, in an Invite message, an indication that the UE supports vSRVCC pre-negotiation; after completing establishment of a session, the SCC AS initiatively requests, from the UE, relevant information required for establishing a CS video call and sends the obtained information to the MSC server; and after the MSC server sends a negotiation result of the CS video call to the SCC AS, the SCC AS sends the negotiation result to the UE to complete pre-negotiation.

As shown in FIG. 3, specific steps include:

In step 302, the UE initiates a video call request in an IMS domain, and includes, in a session Invite (invite) message, indication information that the UE supports the vSRVCC pre-negotiation. For example, the following special tag may be carried in a contact header: g.3gpp.vsrvcc_preNegotiation.

In step 2, after receiving the Invite message, the SCC AS performs IMS video call negotiation with a peer end.

In step 304, the SCC AS obtains position information of the UE according to a call request (Invite) message of the UE (for example, the SCC AS may obtain the position information of the UE according to a P-Visited-Network-Id header or P-Access-Network-Info header in the request message of the UE), and judges an address of a target MSC server to which the UE is transferred. It should be specified that, if the MSC server joins a session link during establishment of an IMS session, the SCC AS can know an address of the MSC server. In this case, step 304 may be omitted.

In step 306, the SCC AS returns a 200 OK message to the UE, and carries, in the message, an indication whether a network supports the vSRVCC pre-negotiation. The indication is obtained according to whether the SCC AS and the MSC server support the vSRVCC pre-negotiation.

In step 308, the SCC AS sends an Options message to the UE, and indicates, through an Accept header, that it is expected to obtain relevant information that is of the UE and is required for establishing CS video. For example, content of the Accept message header specifically is Accept: application/xml_vsrvcc_preNegotiation.

In step 310, the UE carries, through an xml message body of a 200 OK message, a parameter that is of the UE and is required for establishing the CS video call, namely, the information that is of the UE and is required for establishing the CS video call. For example, when the CS video call is established by adopting the 3G-324M technology/standard, the information that is of the UE and is required for establishing the CS video call (3G-324M related information) includes the following information:

(1) H.223 Multiplexer level detection,
(2) Terminal Capability Exchange,
(3) Master Slave determination,
(4) Open Logical Channels,
(5) Multiplexer Table Entries Exchange,
(6) Whether a UE supports an SCUDIF, where (6) is an optional item.

In step 312, after obtaining the relevant information that is of the UE and is required for establishing the CS video call (for example, 3G-324M related information), the SCC AS sends, to the MSC server, the information which, for example, may be carried through an xml message body of a Message or an Info message.

In step 314, the MSC server determines, according to the parameter that is of the UE and is required for establishing the CS video call, a parameter used for a subsequent CS video call, and sends the parameter through an xml message body of a 200 OK message to the SCC AS.

In step 316, the SCC AS sends the UE a result of CS video call parameter pre-negotiation through an xml message body of a Message or an Info message.

In step 318, the UE replies a 200 OK message.

In step 4, the UE sends measurement reports to an E-UMTS Terrestrial Radio Access Network (UTRAN).

In step 5, based on the measurement reports of the UE, a source E UTRAN decides to send an SRVCC Handover (HO) request to a UTRAN.

In step 6, the source E UTRAN sends a video handover request to a source Mobility Management Entity (MME).

In step 7, based on the video handover request message, the source MME separates a bearer of the video call from a data bearer, and initiates a procedure to the MSC server.

In step 8:

8*a*: The source MME sends a vSRVCC PS-CS HO request to the MSC server.

8*b*: The MSC server converts the PS-CS HO request into a CS inter-MSC HO request, and sends a prepare handover request to a target MSC. If the message in step 312 includes an indication that the UE supports the SCUDIF, the MSC server includes, in a transfer request, an indication of establishing dual bearers (a voice bearer and a multimedia bearer).

8*c*: The target MSC sends a handover request to a target Radio Network Subsystem (RNS) to request the target RNS to perform resource allocation.

In step 9:

9*a*: The target RNS returns a handover request acknowledgment (Handover Request ACK) message.

9*b*: The target MSC sends a prepare handover response message to the MSC server.

9*c*: Establish a circuit connection between the target MSC and an MGW related to the MSC server.

In step 10, the MSC server initiates a transfer request to the SCC AS. A called number in the transfer request is an STN-SR. The MSC server generates an SDP according to a negotiation result of a pre-negotiated CS video call, and sends the SDP to the SCC AS.

In step 11, the SCC AS initiates a transfer process, and updates the peer end.

In step 12, the MSC server sends a PS to CS Response message to the source MME, where the message carries resource information related to a multimedia bearer.

In step 13, the source MME sends a handover command to the source E-UTRAN.

In step 14, the source E-UTRAN sends the UE a handover from E-UTRAN command (Handover from E-UTRAN Command).

In step 15, the UE is transferred to the UTRAN, disables an EPS radio frequency, and enables a UTRAN radio frequency.

In step 16, the target RNS executes HO detection. The UE sends a HO complete message through the target RNS to the target MSC. If the target MSC is not the MSC server, the target MSC sends the Handover Complete message to the MSC server.

In step 320, the UE sends, to the MSC server, a negotiated parameter activation message, for example, an H.223 bearer setup message. Through this message, the MSC server/MGW is enabled to know that a parameter (for example, 3G-324M) negotiated through the IMS domain is activated.

In step 322, the MSC server/MGW returns a negotiated parameter activation ACK message, for example, an H.245 Open logic channels message.

In step 324, a CS domain video call connection is established to complete a subsequent transfer step.

It should be specified that, steps 320 and 322 in the foregoing embodiment are optional, and the UE and MSC server may also change their own states into a state of the video call after steps 15 and 12, respectively.

It should be specified that in the foregoing embodiment, the SCC AS initiatively obtains, from the UE, information required for CS video. In another embodiment of the present invention, after step 306, the UE initiatively sends, according to the indication that the network supports the vSRVCC pre-negotiation in the 200 OK, the network the information that is of the UE and is required for establishing the CS video call, where the information that is of the UE and is required for establishing the CS video call may be specifically carried through an xml message body of a Message or an Info message.

It should be specified that, for a specific UE, only one video call can exist for the UE in the CS domain at the same time, and for the UE, an encoding manner for the video call in the CS domain is the same. Therefore, steps 308 to 318 may need to be executed only once. Other embodiments of the present invention may be implemented with reference to this embodiment.

Figure 4:
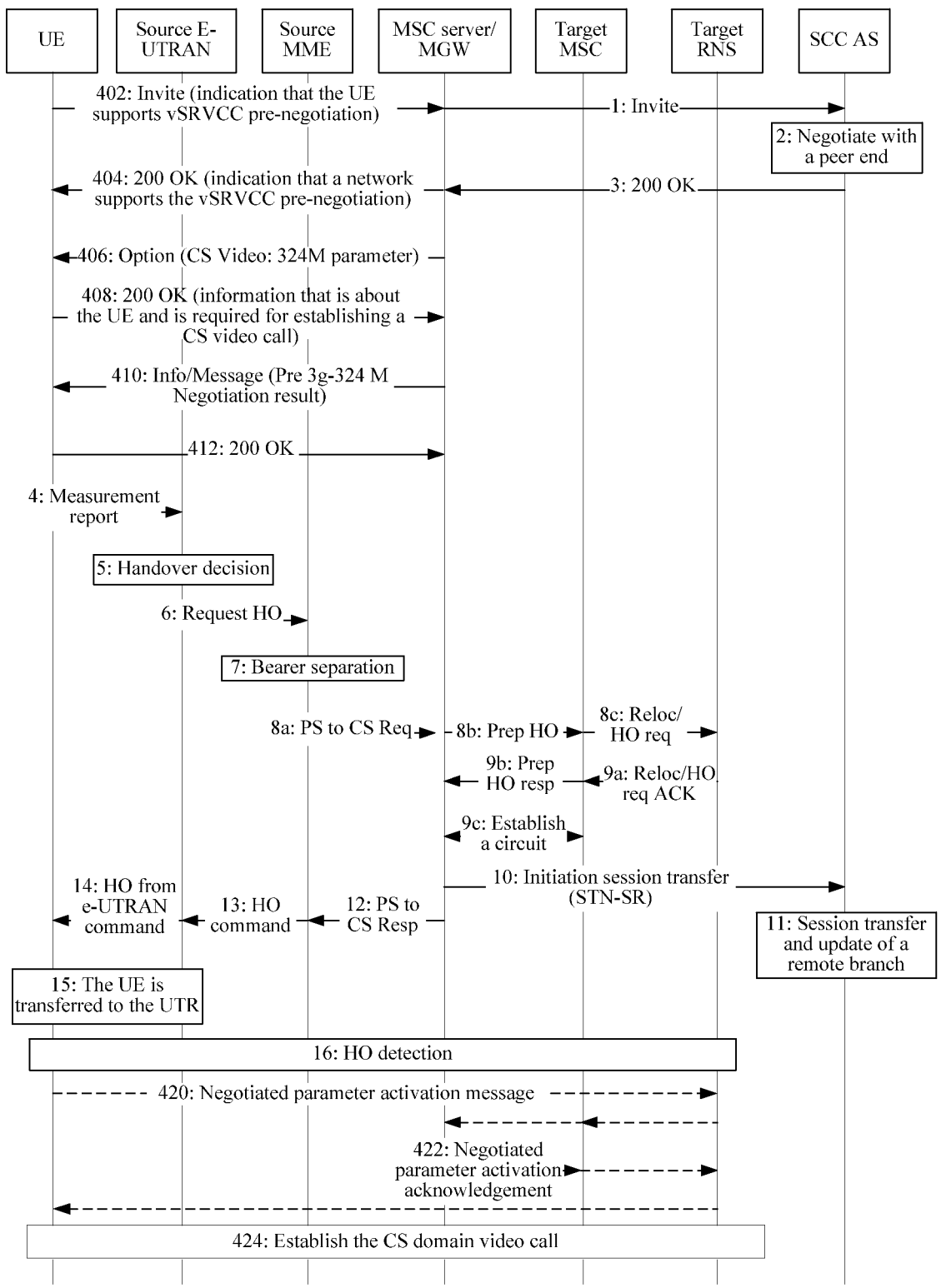
FIG. 4 is a signaling diagram of another embodiment of a method for transferring a video call between access networks according to the present invention.

FIG. 4 is a signaling diagram of another embodiment of a method for transferring a video call between access networks according to the present invention. A major procedure in this embodiment is similar to that in the embodiment shown in FIG. 3. However, in this embodiment, an MSC server joins a signaling link when a UE establishes an IMS session. Therefore, an SCC AS may not participate in a pre-negotiation process, and the process of pre-negotiation with the UE is directly initiated by the MSC server.

As shown in FIG. 4, specific steps include:

In step 402, the UE initiates, in an IMS and through an Invite message, a video call establishment process. The Invite message is routed to the MSC server. The Invite message includes indication information that the UE supports vSRVCC pre-negotiation. For example, the following special tag may be carried in a contact header: g.3gpp.vsrvcc_preNegotiation.

In step 1, the MSC server deletes the tag in the message, and sends the Invite message to the SCC AS.

In step 2, the SCC AS performs IMS video call negotiation with a peer end.

In step 3, the SCC AS returns a 200 OK acknowledgment message to the MSC server.

In step 404, the MSC server sends the 200 OK message to the UE. The MSC server adds, in the 200 OK message, an indication whether the vSRVCC pre-negotiation is supported.

In step 406, the MSC server sends, in the IMS domain, an Options message to the UE, and indicates, through an Accept header, that it is expected to obtain relevant information that is of the UE and is required for establishing CS video. Content of the Accept message header specifically is Accept: application/xml_vsrvcc_preNegotiation. (This message needs to be transferred through an S-CSCF in a homing region of the UE, which is omitted in the drawing.)

In step 408, the UE carries, through an xml message body of a 200 OK message, the information that is of the UE and is required for establishing the CS video call. For example, when the CS video call is established by adopting the 3G-324M technology/standard, the information that is of the UE and is required for establishing the CS video call (3G-324M related information) includes the following information:

(1) H.223 Multiplexer level detection,
(2) Terminal Capability Exchange,
(3) Master Slave determination,
(4) Open Logical Channels,
(5) Multiplexer Table Entries Exchange
(6) Whether a UE supports an SCUDIF, where (6) is an optional item.

In step 410, the MSC server determines, according to the relevant information that is of the UE and is required for establishing the CS video call (for example, 3G-324M related information), a parameter used for a subsequent CS video call, and sends the parameter through an xml message body of a Message or an Info message to the UE.

In step 412, the UE replies a 200 OK message to complete a negotiation process of a CS video call parameter.

For subsequent steps 4 to 16, reference may be made to steps 4 to 16 in FIG. 3; for steps 420 to 424, reference may be made to corresponding steps 320 to 324 in FIG. 3.

It should be specified that, steps 420 and 422 in the foregoing embodiment are optional, and the UE and MSC server may also change their own states into a state of the video call after steps 15 and 12, respectively.

It should be specified that in the foregoing embodiment, the MSC server initiatively obtains, from the UE, the information required for establishing the CS video. In another embodiment of the present invention, after step 404, the UE initiatively sends, according to an indication that a network supports the vSRVCC pre-negotiation in the 200 OK, the network the information that is of the UE and is required for establishing the CS video call, where the information that is of the UE and is required for establishing the CS video call may be specifically carried through an xml message body of a Message or an Info message.

It should be noted that in this embodiment, the SCC AS may not need to be enhanced.

It should be specified that in the embodiments of FIG. 3 and FIG. 4, the UE and a network side perform negotiation of the CS video call parameter after establishment of the video call in the IMS domain is completed. Those skilled in the art should understand that, the UE and the network side may also complete the negotiation of the CS video call parameter, for example, after step 9c, and the present invention may be implemented as well.

Figure 5:
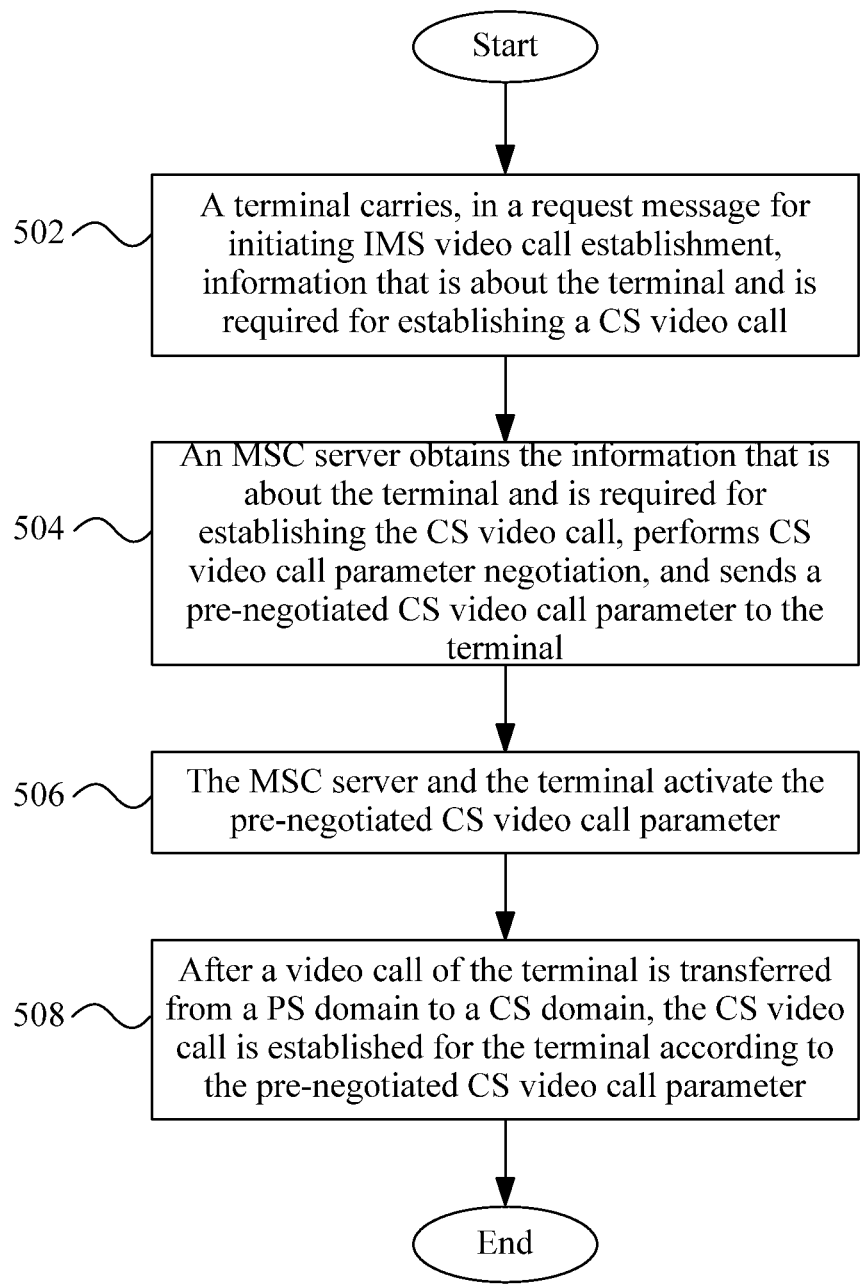
FIG. 5 is a flowchart of another embodiment of a method for transferring a video call between access networks according to the present invention.

FIG. 5 is a flowchart of another embodiment of a method for transferring a video call between access networks according to the present invention.

As shown in FIG. 5, in step 502, a terminal carries, in a request message for initiating IMS video call establishment (for example, Invite message), information that is about the terminal and is required for establishing a CS video call.

In step 504, an MSC server obtains the information that is about the terminal and is required for establishing the CS video call, performs CS video call parameter pre-negotiation to obtain a pre-negotiated CS video call parameter, and sends the pre-negotiated CS video call parameter to the terminal.

In step 506, the MSC server and the terminal activate the pre-negotiated CS video call parameter. It should be specified that, step 506 may be performed before a video call of the terminal is transferred from a PS domain to a CS domain, and may also be performed after the video call of the terminal is transferred from the PS domain to the CS domain.

In step 508, after the video call of the terminal is transferred from the PS domain to the CS domain, the CS video call is established for the terminal according to the pre-negotiated CS video call parameter.

In this embodiment, the terminal carries, in the request message for initiating the IMS video call establishment, the information that is of the terminal and is required for establishing the CS video call, to directly trigger a process that the terminal and the network side negotiate the CS video call parameter, which is a simple procedure.

Figure 6:
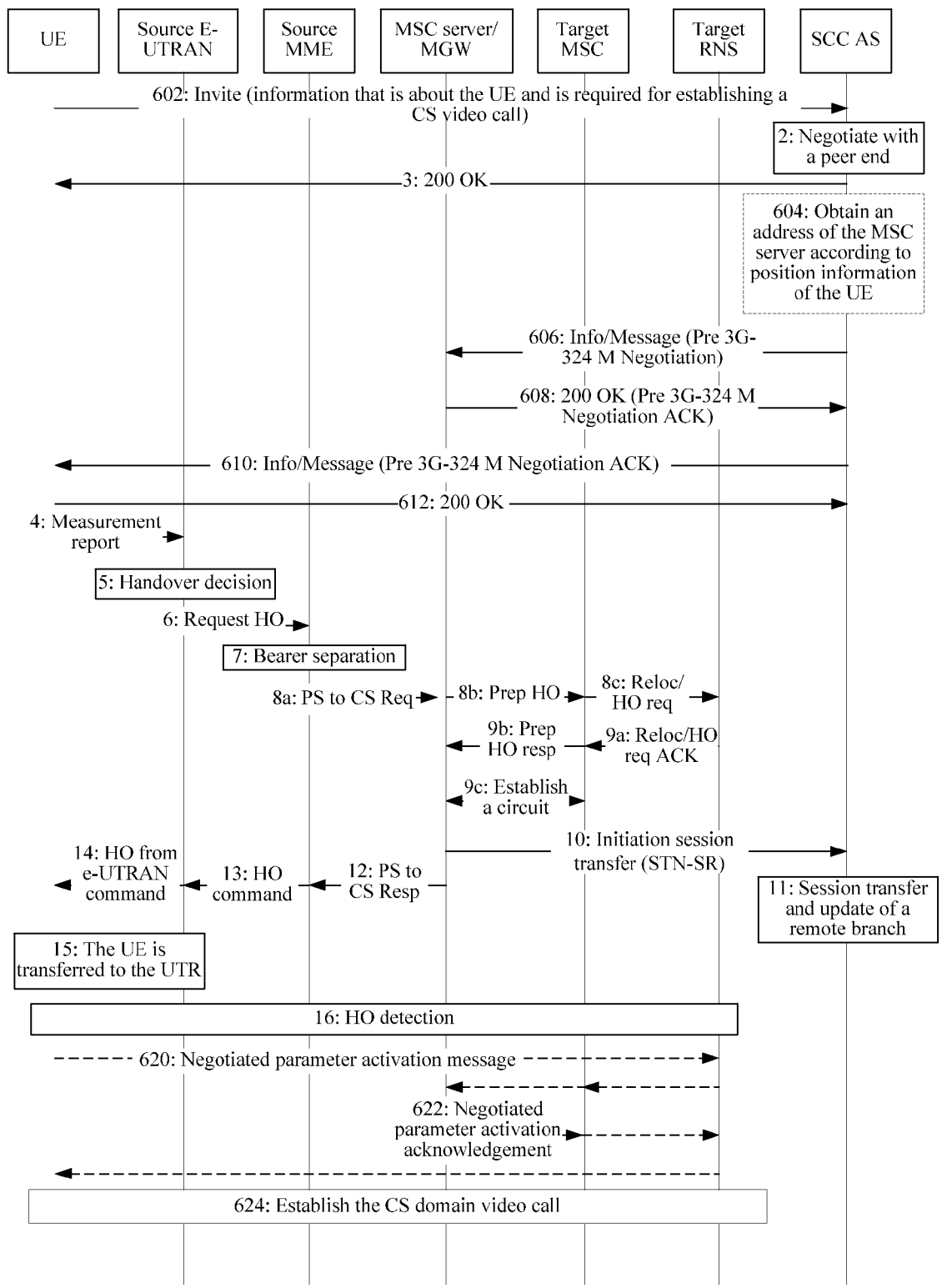
FIG. 6 is a signaling diagram of another embodiment of a method for transferring a video call between access networks according to the present invention.

FIG. 6 is a signaling diagram of another embodiment of a method for transferring a video call between access networks according to the present invention. In this embodiment, when initiating IMS video call establishment, a UE carries, through an XML message body in an Invite message, relevant information required for establishing a CS video call. After establishment of a session ends, an SCC AS sends the relevant information to an MSC server. The MSC server sends a negotiation result of a video call to the SCC AS, and the SCC AS sends the negotiation result to the UE to complete pre-negotiation.

As shown in FIG. 6, specific steps include:

In step 602, the UE initiates the video call in an IMS domain, and carries, through the xml message body, information that is of the UE and is required for establishing the CS video call (for example, 3G-324M related information), where the information that is of the UE and is required for establishing the CS video call includes the following information:

(1) H.223 Multiplexer level detection,
(2) Terminal Capability Exchange,
(3) Master Slave determination,
(4) Open Logical Channels,
(5) Multiplexer Table Entries Exchange,
(6) Whether a UE supports an SCUDIF, where (6) is an optional item.

In step 2, the SCC AS performs IMS video call negotiation with a peer end.

In step 3, the SCC AS returns a 200 OK message to the UE.

In step 604, the SCC AS obtains position information of the UE according to the request message of the UE (for example, the SCC AS may obtain the position information of the UE according to a P-Visited-Network-Id header or P-Access-Network-Info header in the request message of the UE), and judges an address of a target MSC server to which the UE is transferred.

It should be noted that, step 604 is optional. If the MSC server joins a session link during establishment of an IMS session, the SCC AS may know an address of the MSC server. In this case, step 604 may not be executed.

In step 606, after obtaining the relevant information that is of the UE and is required for establishing the CS video call (for example, 3G-324M related information), the SCC AS sends, to the MSC server, the information that is, for example, carried in an xml message body of a Message or an Info message.

In step 608, the MSC server determines, according to a Video pre-negotiated parameter of the UE, a parameter used for a subsequent CS video call, and sends the parameter through an xml message body of a 200 OK message to the SCC AS.

In step 610, the SCC AS sends a Video pre-negotiation result to the UE through an xml message body of a Message or an Info message.

In step 612, the UE replies a 200 OK message.

For steps 4 to 16, reference is made to steps 4 to 16 in FIG. 3; for steps 620 to 624, reference is made to corresponding steps in FIG. 3.

Figure 7:
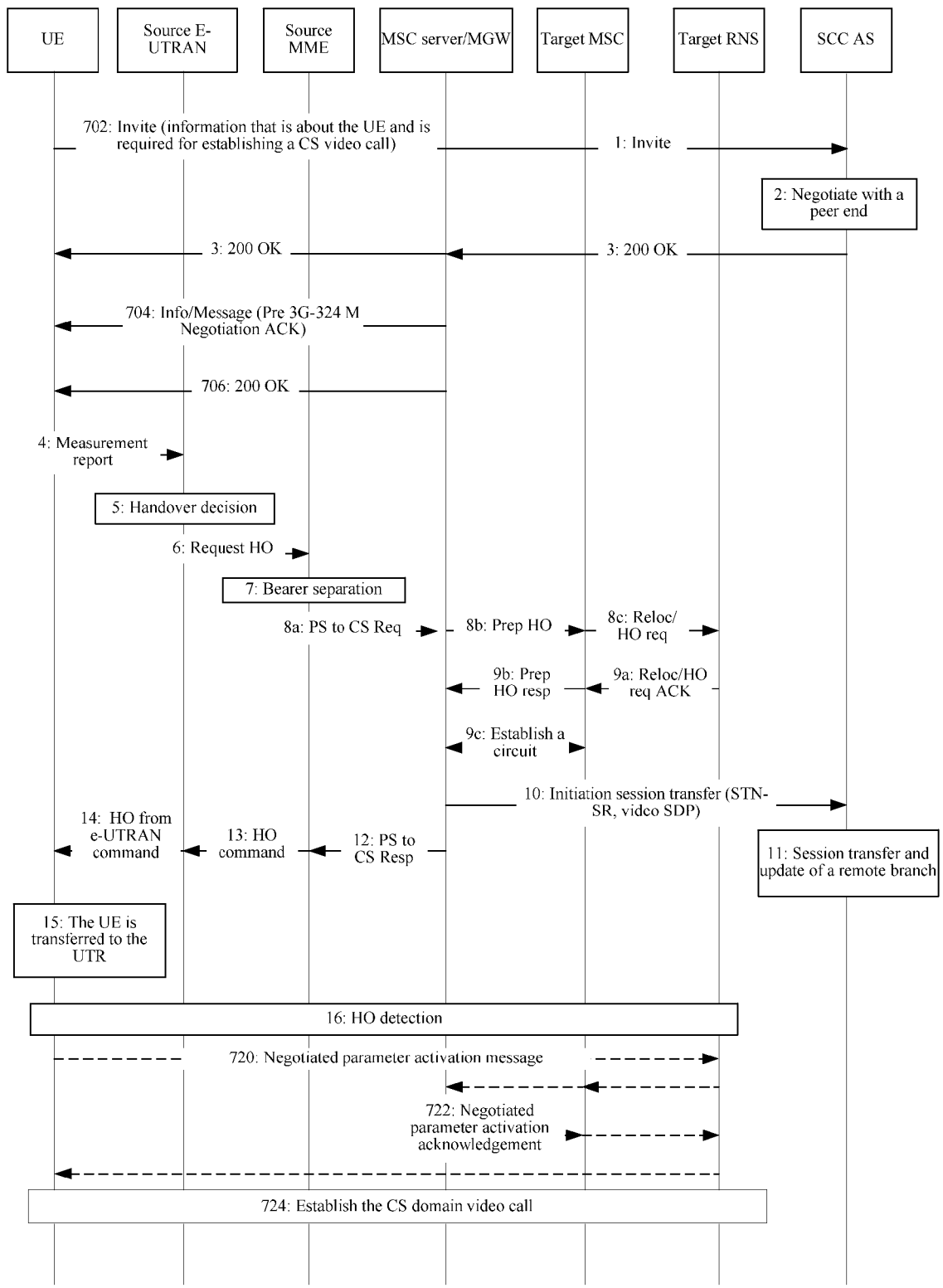
FIG. 7 is a signaling diagram of another embodiment of a method for transferring a video call between access networks according to the present invention.

FIG. 7 is a signaling diagram of another embodiment of a method for transferring a video call between access networks according to the present invention. A major procedure in this embodiment is similar to that in the embodiment shown in FIG. 6. However, in this embodiment, an MSC server joins a signaling link when a UE establishes an IMS session. Therefore, an SCC AS may not need to participate in a pre-negotiation process of a CS video call parameter, and the process of pre-negotiation with the UE is directly initiated by the MSC server.

As shown in FIG. 7, specific steps include:

In step 702, the UE initiates a video session in an IMS domain, where a request is routed to the MSC server, and information that is of the UE and is required for establishing a CS video call (for example, 3G-324M related information) is carried through an xml message body, and includes the following information:

(1) H.223 Multiplexer level detection,
(2) Terminal Capability Exchange,
(3) Master Slave determination,
(4) Open Logical Channels,
(5) Multiplexer Table Entries Exchange,
(6) Whether a UE supports an SCUDIF, where (6) is an optional item.

In step 1, the MSC server sends the call to the SCC AS. The MSC server deletes the xml message body.

In step 2, the SCC AS performs video session negotiation with a peer end.

In step 3, the SCC AS returns a 200 OK acknowledgment message to the UE, and the SCC AS returns a 200 OK message to the UE.

In step 704, the MSC server determines, according to the information that is of the UE and is required for establishing the CS video call (for example, 3G-324M related information), a parameter used for a subsequent CS video call, and sends the parameter through an xml message body of a Message or an Info message to the UE.

In step 706, the UE replies a 200 OK message.

For steps 4 to 16, reference is made to steps 4 to 16 in FIG. 3; for steps 720 to 724, reference is made to corresponding steps in FIG. 3.

It should be noted that in this embodiment, the SCC AS may not need to be enhanced.

Figure 8:
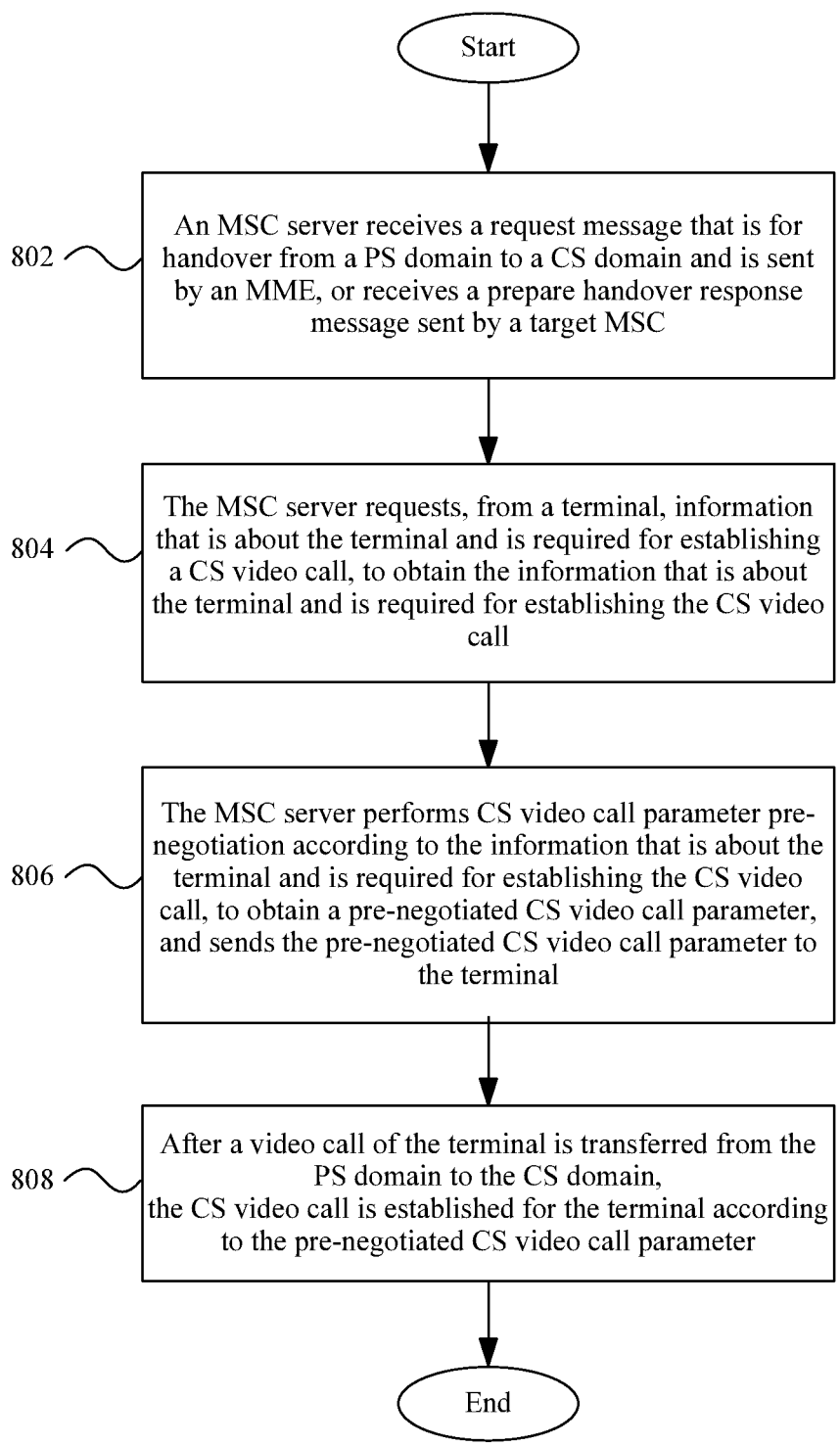
FIG. 8 is a flowchart of another embodiment of a method for transferring a video call between access networks according to the present invention.

FIG. 8 is a flowchart of another embodiment of a method for transferring a video call between access networks according to the present invention.

As shown in FIG. 8, in step 802, an MSC server receives a request message that is for handover from a PS domain to a CS domain and is sent by an MME, or receives a prepare handover response message sent by a target MSC.

In step 804, the MSC server requests, from the terminal, information that is about the terminal and is required for establishing a CS video call, to obtain the information that is about the terminal and is required for establishing the CS video call.

In step 806, the MSC server performs CS video call parameter pre-negotiation according to the information that is about the terminal and is required for establishing the CS video call, to obtain a pre-negotiated CS video call parameter, and sends the pre-negotiated CS video call parameter to the terminal.

In step 808, after a video call of the terminal is transferred from the PS domain to the CS domain, the CS video call is established for the terminal according to the pre-negotiated CS video call parameter.

Figure 9:
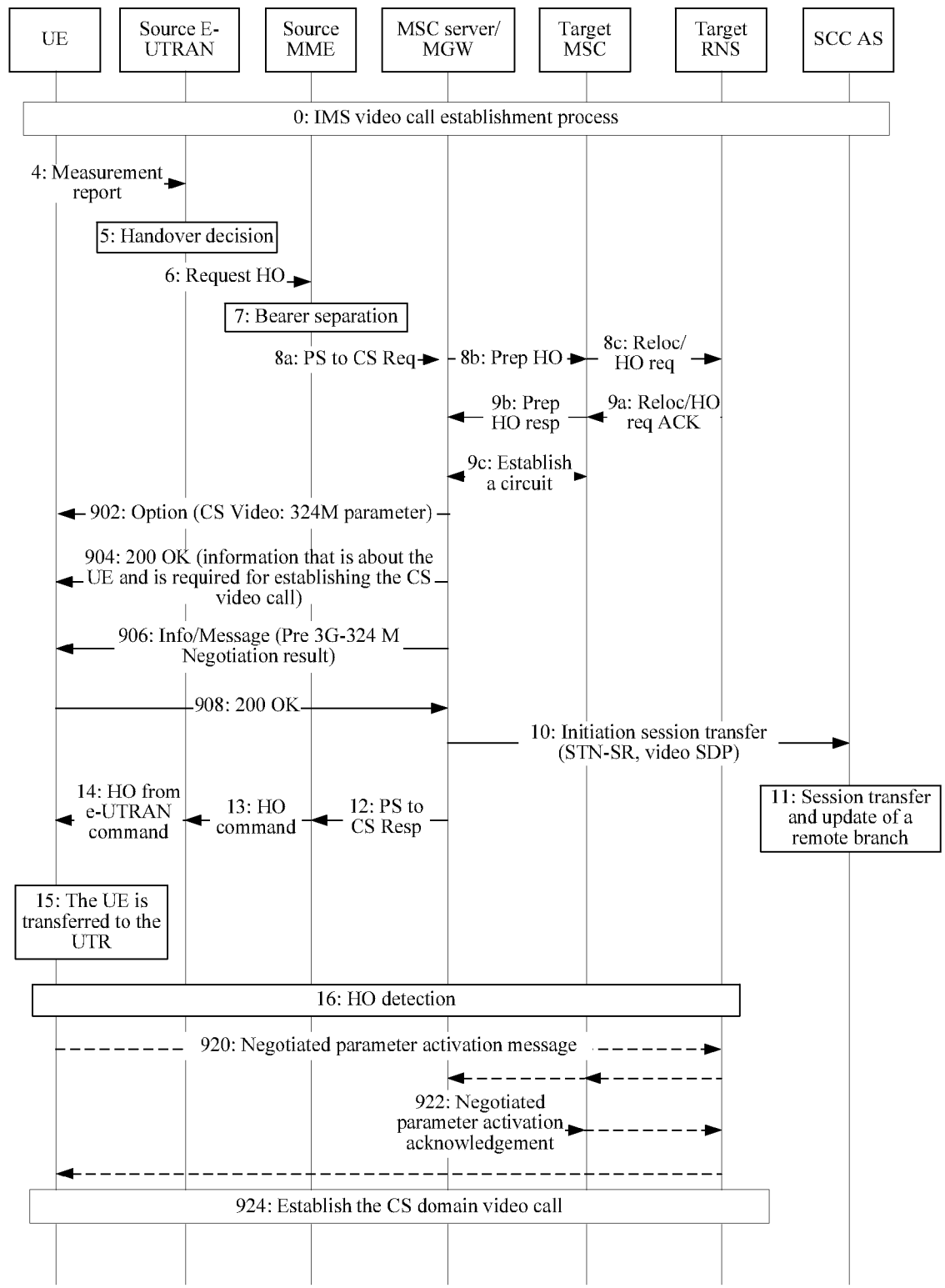
FIG. 9 is a signaling diagram of another embodiment of a method for transferring a video call between access networks according to the present invention.

FIG. 9 is a signaling diagram of another embodiment of a method for transferring a video call between access networks according to the present invention. Pre-negotiation is performed in a transfer process. That is, after receiving a transfer request sent by an MME, an MSC server requests, from a UE, relevant information required for establishing a CS video call, and directly sends a negotiation result to the UE. After the negotiation is completed, the MSC server initiates a transfer request to an SCC AS.

As shown in FIG. 9, specific steps include:

In step 0, the UE initiates a video call establishment process in an IMS.

Steps 4 to 9 (refer to steps 4 to 9 in FIG. 3).

In step 902, the MSC server sends, in an IMS domain, an Options message to the UE, and indicates, through an Accept header, that it is expected to obtain relevant information that is of the UE and is required for establishing the CS video call. Content of the Accept header specifically is Accept: application/xml_vsrvcc_preNegotiation. (This message needs to be transferred through an S-CSCF in a homing region of the UE, which is omitted in the drawing.)

It should be specified that, the MSC server may also obtain, from the UE and through a Message or an Info message, the information required for establishing the CS video call.

In step 904, the UE carries, through an xml message body of a 200 OK message, the information that is of the UE and is required for establishing the CS video call, where the information that is of the UE and is required for establishing the CS video call includes the following information:

(1) H.223 Multiplexer level detection,
(2) Terminal Capability Exchange,
(3) Master Slave determination,
(4) Open Logical Channels,
(5) Multiplexer Table Entries Exchange,
(6) Whether a UE supports an SCUDIF, where (6) is an optional item.

In step 906, the MSC server determines, according to a Video pre-negotiated parameter of the UE, a parameter used for a subsequent CS video call, and sends the parameter through, for example, an xml message body of a Message or an Info message to the UE.

In step 908, the UE replies a 200 OK message.

In step 10, the MSC server generates an SDP according to a negotiation result of the pre-negotiated CS video call in step 906, and sends the SDP to the SCC AS.

For steps 11 to 16, reference is made to steps 11 to 16 in FIG. 3; for steps 920 to 924, reference is made to corresponding steps in FIG. 3.

It should be specified that in the embodiment shown in FIG. 9, the UE and a network side start negotiation of a CS video call parameter after step 9b. Those skilled in the art should understand that, the UE and the network side may also start the negotiation of the CS video call parameter after step 8a, and the present invention may be implemented as well.

It should be specified that in the embodiment shown in FIG. 9, in step 10, the MSC server generates the SDP according to the negotiation result of the pre-negotiated CS video call in step 906, and sends the SDP to the SCC AS. Those skilled in the art should understand that, it may also be adjusted that step 10 is directly executed after step 8a. In this case, the SDP in step 10 is media capability information of the MSC server/MGW, and step 8b to step 906 are executed in step 10 in sequence.

It should be specified that in the embodiments shown in FIGS. 3, 4, 6, 7, and 9, transfer from an SAE network to a UMTS network is taken as an example to introduce the embodiments of transferring a video call between access networks according to the present invention. Those skilled in the art should understand that, the procedures in the embodiments of the present invention are also applicable to a case of transfer from an SAE network to a GSM network.

It should be specified that in the embodiments shown in FIGS. 3, 4, 6, 7, and 9, that the 3G-324M technology/standard is adopted to establish the video call is taken as an example to introduce the negotiation of the CS video call parameter. Those skilled in the art should understand that the technical solutions in the present invention is not limited to the 3G-324M technology/standard, and the H.324M technology/standard, for example, may also be adopted to establish the video call, which also falls within the protection scope of the present invention.

Figure 10:
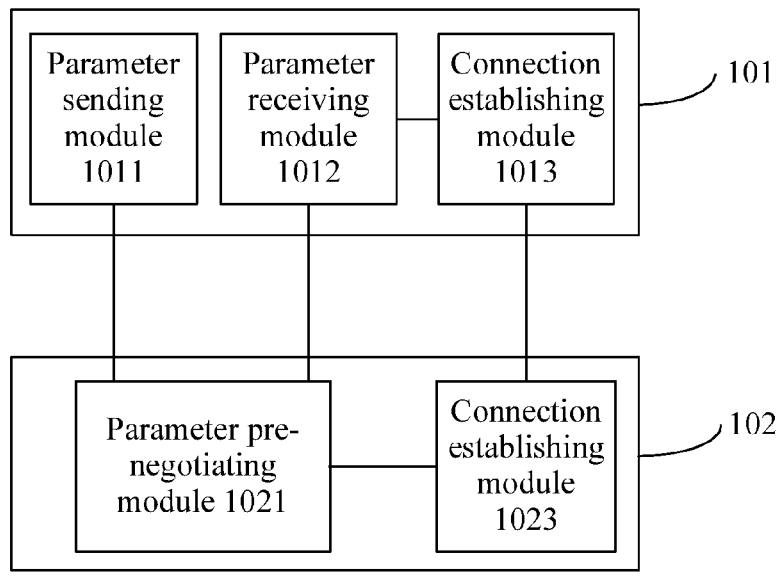
FIG. 10 is a structural diagram of an embodiment of a system for transferring a video call between access networks according to the present invention.

FIG. 10 is a structural diagram of an embodiment of a system for transferring a video call between access networks according to the present invention. As shown in FIG. 10, the system includes a terminal 101 and an MSC server 102. The terminal 101 includes a parameter sending module 1011, a parameter receiving module 1012, and a connection establishing module 1013, and the MSC server 102 includes a parameter pre-negotiating module 1021 and a connection establishing module 1023. The parameter sending module 1011 is configured to, when a video call of the terminal is in a PS domain, send, through IMS signaling, information that is of the terminal and is required for establishing a CS video call; the parameter receiving module 1012 is configured to, when the video call of the terminal is in the PS domain, receive a pre-negotiated CS video call parameter through the IMS signaling; and the connection establishing module 1013 is configured to, after the video call of the terminal is transferred to a CS domain, establish the CS video call for the terminal according to the pre-negotiated CS video call parameter. The parameter pre-negotiating module 1021 is configured to: when the video call of the terminal is in the PS domain, obtain the information that is of the terminal and is required for establishing the CS video call, perform CS video call parameter pre-negotiation to obtain the pre-negotiated CS video call parameter, and send the pre-negotiated CS video call parameter to the terminal; and the connection establishing module 1023 is configured to, after the video call of the terminal is transferred to the CS domain, establish the CS video call for the terminal according to the pre-negotiated CS video call parameter.

According to an embodiment of the present invention, the parameter sending module 1011 is specifically configured to, when the video call of the terminal is in the PS domain, carry, in a request message for initiating IMS video call establishment (for example, Invite message), the information that is of the terminal and is required for establishing the CS video call; the parameter pre-negotiating module 1021 receives, through the request message for initiating the IMS video call establishment, the information that is of the terminal and is required for establishing the CS video call. According to an embodiment of the present invention, the parameter pre-negotiating module 1021 is configured to, after the MSC server receives a transfer request, obtain, through the IMS signaling, the information that is of the terminal and is required for establishing the CS video call, perform CS video call parameter negotiation, send the pre-negotiated CS video call parameter to the terminal, and send a transfer request to an SCC AS.

In this embodiment, the parameter pre-negotiating module of the MSC server and a corresponding module of the terminal pre-negotiate the CS video call parameter before the video call of the terminal is transferred from the PS domain to the CS domain, and after transfer to the CS domain, the terminal and the connection establishing module of the MSC server establish the CS video call by directly using the pre-negotiated CS video call parameter, which avoids voice and video interruption caused by negotiation of the CS video call parameter during a handover process of the video call of the UE from the PS domain to the CS domain, and improves user experience. The terminal carries, in the request message for initiating the IMS video call establishment, the information that is of the terminal and is required for establishing the CS video call, to directly trigger a process that the terminal and a network side negotiate the CS video call parameter, which is a simple procedure.

Figure 11:
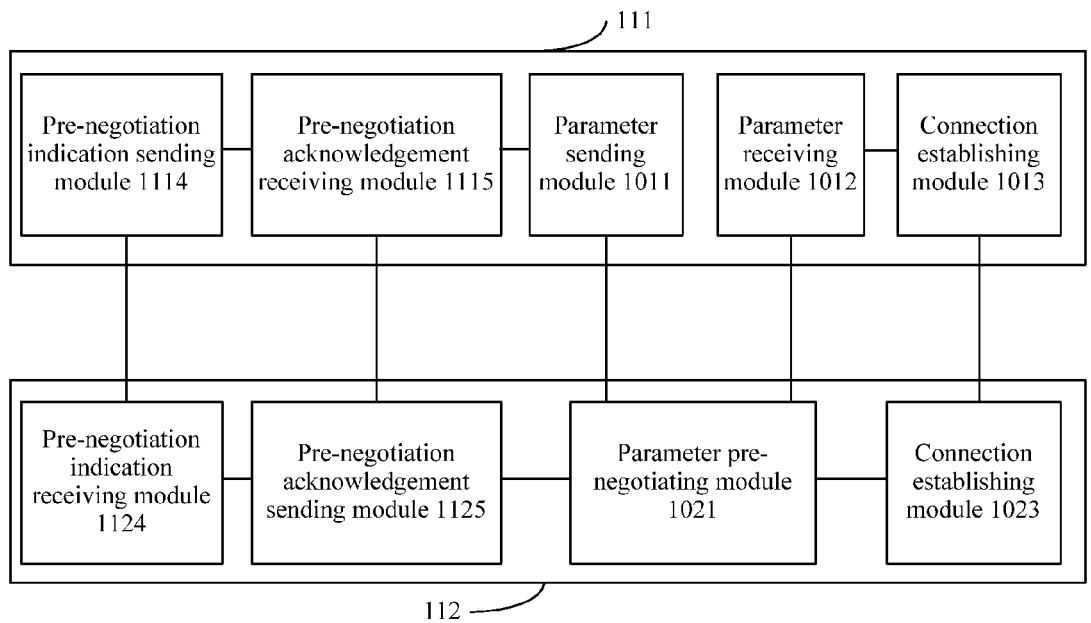
FIG. 11 is a structural diagram of another embodiment of a system for transferring a video call between access networks according to the present invention.

FIG. 11 is a structural diagram of another embodiment of a system for transferring a video call between access networks according to the present invention. As shown in FIG. 11, the system includes a terminal 111 and an MSC server 112. The terminal 111 includes a pre-negotiation indication sending module 1114, a pre-negotiation acknowledgment receiving module 1115, a parameter sending module 1011, a parameter receiving module 1012, and a connection establishing module 1013, and the MSC server 112 includes a pre-negotiation indication receiving module 1124, a pre-negotiation acknowledgment sending module 1125, a parameter pre-negotiating module 1021, and a connection establishing module 1023. For the parameter sending module 1011, the parameter receiving module 1012 and the connection establishing module 1013 in the terminal 111 and the connection establishing module 1023 in the MSC server 112, reference may be made to the descriptions of corresponding modules in FIG. 10, and for conciseness, details are not repeatedly described here. The pre-negotiation indication sending module 1114 is configured to carry, in a request message for initiating IMS video call establishment (for example, Invite message), an indication that the terminal supports vSRVCC pre-negotiation; and the pre-negotiation acknowledgement receiving module 1115 is configured to receive, through an acknowledgement message of the IMS video call establishment, an acknowledgment that a network side supports the vSRVCC pre-negotiation. The pre-negotiation indication receiving module 1124 is configured to receive the indication that the terminal supports the vSRVCC pre-negotiation, where the indication is carried in the request message for initiating the IMS video call establishment; and the pre-negotiation acknowledgment sending module 1125 is configured to send, through the acknowledgement message of the IMS video call establishment, the acknowledgment that the network side supports the vSRVCC pre-negotiation. After the terminal and the MSC server acknowledge that both support the vSRVCC pre-negotiation, a process of CS video parameter pre-negotiation is performed. The parameter pre-negotiating module 1021 is specifically configured to, when the terminal is in a packet switching PS domain, and after the pre-negotiation indication receiving module 1124 receives the indication that the terminal supports the vSRVCC pre-negotiation, obtain a CS video call parameter of the terminal through IP multimedia subsystem IMS signaling, perform the CS video call parameter pre-negotiation to obtain a pre-negotiated CS video call parameter, and send the pre-negotiated CS video call parameter to the terminal.

In this embodiment, before the CS video call parameter pre-negotiation is performed, whether the terminal and the network side support the CS video call parameter pre-negotiation is pre-acknowledged by the pre-negotiation indication sending module, the pre-negotiation indication receiving module, the pre-negotiation acknowledgment sending module, and the pre-negotiation acknowledgment receiving module, and in a case that it is acknowledged that both the terminal and the network side support the CS video call parameter pre-negotiation, the CS video call parameter pre-negotiation is performed, which makes the procedure more flexible and reasonable.

Figure 12:
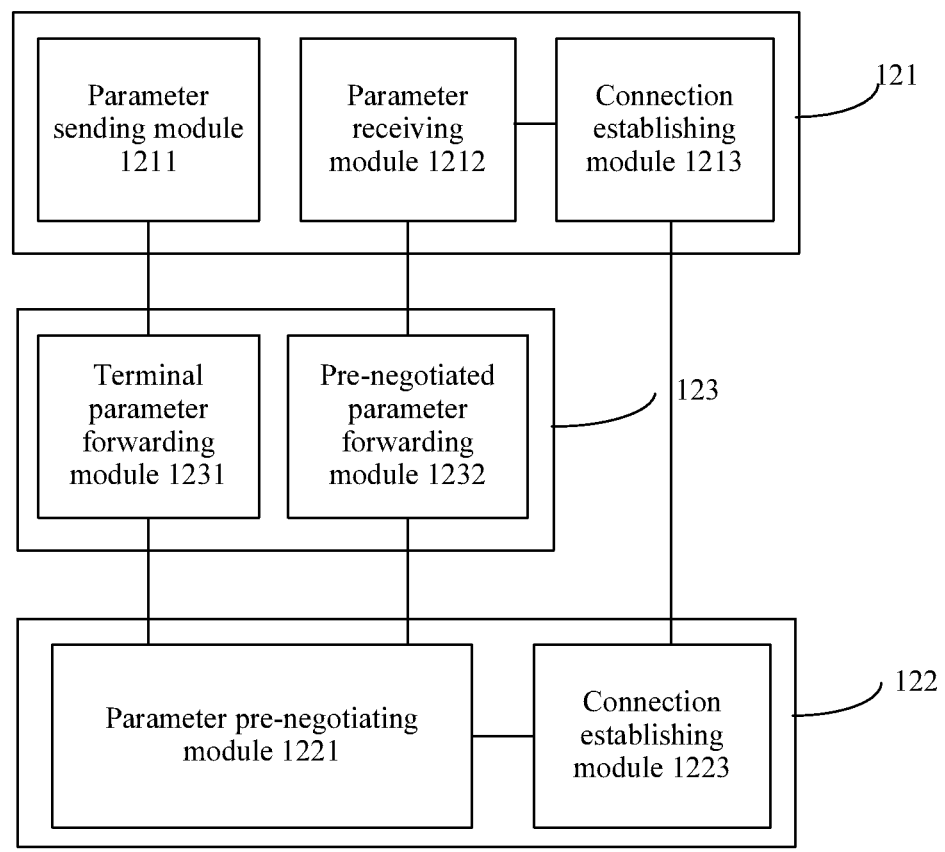
FIG. 12 is a structural diagram of another embodiment of a system for transferring a video call between access networks according to the present invention.

FIG. 12 is a structural diagram of another embodiment of a system for transferring a video call between access networks according to the present invention. As shown in FIG. 12, the system includes a terminal 121, an MSC server 122, and an SCC AS 123. The terminal 121 includes a parameter sending module 1211, a parameter receiving module 1212, and a connection establishing module 1213, the MSC server 122 includes a parameter pre-negotiating module 1221 and a connection establishing module 1223, and the SCC AS 123 includes a terminal parameter forwarding module 1231 and a pre-negotiated parameter forwarding module 1232. For major functions of the parameter sending module 1211, the parameter receiving module 1212, and the connection establishing module 1213 in the terminal 121, and the parameter pre-negotiating module 1221 and the connection establishing module 1223 in the MSC server 122, reference may be made to the descriptions of corresponding modules in FIG. 10 and FIG. 11, and for conciseness, the details are not repeatedly described here. Differences from the embodiments shown in FIG. 10 and FIG. 11 are as follows: Negotiation of a CS video call parameter between the terminal 121 and the MSC server 122 is performed under the control of the SCC AS 123, and pre-negotiated CS video call parameter and information that is of the terminal and is required for establishing a CS video call are transmitted between the terminal 121 and the MSC server 122 through forwarding by the SCC AS 123. Specifically, the terminal parameter forwarding module 1231 is configured to obtain a CS video call parameter of the terminal 121 through IMS signaling, and forward the CS video call parameter to the MSC server 122; and the pre-negotiated parameter forwarding module 1232 is configured to receive, through the IMS signaling, the pre-negotiated CS video call parameter from the MSC server 122, and forward the pre-negotiated CS video call parameter to the terminal 121. For example, the terminal parameter forwarding module 1231 receives the CS video call parameter of the terminal 121 through a request message that is sent by the terminal and used for initiating IMS video call establishment, and then sends the CS video call parameter to the MSC server 122.

Figure 13:
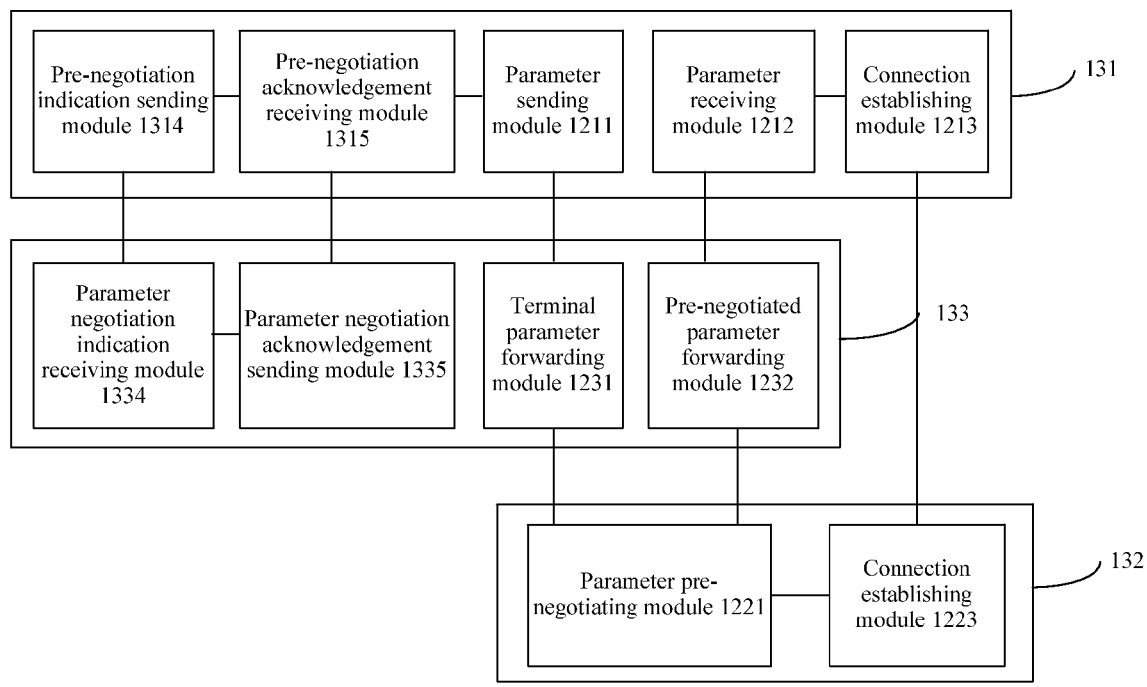
FIG. 13 is a structural diagram of another embodiment of a system for transferring a video call between access networks according to the present invention.

FIG. 13 is a structural diagram of another embodiment of a system for transferring a video call between access networks according to the present invention. As shown in FIG. 13, the system includes a terminal 131, an MSC server 132, and an SCC AS 133. The terminal 131 includes a pre-negotiation indication sending module 1314, a pre-negotiation acknowledgement receiving module 1315, a parameter sending module 1211, a parameter receiving module 1212, and a connection establishing module 1213, the MSC server 132 includes a parameter pre-negotiating module 1221 and a connection establishing module 1223, and the SCC AS 133 includes a pre-negotiation indication sending module 1334, a pre-negotiation acknowledgment receiving module 1335, a terminal parameter forwarding module 1231, and a pre-negotiated parameter forwarding module 1232. For the parameter sending module 1211, the parameter receiving module 1212, and the connection establishing module 1213 in the terminal 131, the parameter pre-negotiating module 1221 and the connection establishing module 1223 of the MSC server 132, and the terminal parameter forwarding module 1231 and the pre-negotiated parameter forwarding module 1232 of the SCC AS 133, reference may be made to the descriptions of corresponding modules in FIG. 12, and for conciseness, details are not repeatedly described here. The pre-negotiation indication sending module 1314 is configured to carry, in a request message for initiating IMS video call establishment (for example, Invite message), an indication that the terminal supports vSRVCC pre-negotiation; and the pre-negotiation acknowledgement receiving module 1315 is configured to receive, through an acknowledgment message of the IMS video call establishment, an acknowledgment that a network side supports the vSRVCC pre-negotiation. The pre-negotiation indication receiving module 1334 is configured to receive the indication that the terminal supports the vSRVCC pre-negotiation, where the indication is carried in the request message for initiating the IMS video call establishment; and the pre-negotiation acknowledgment sending module 1335 is configured to send, through the acknowledgment message of the IMS video call establishment, the acknowledgment that the network side supports the vSRVCC pre-negotiation. After the terminal and the SCC AS acknowledge that both support the vSRVCC pre-negotiation, a process of CS video parameter pre-negotiation is performed.

In this embodiment, before the CS video call parameter pre-negotiation is performed, whether the terminal and the network side support the CS video call parameter pre-negotiation is pre-acknowledged by the pre-negotiation indication sending module, the pre-negotiation indication receiving module, the pre-negotiation acknowledgment sending module, and the pre-negotiation acknowledgment receiving module, and in a case that it is acknowledged that both the terminal and the network side support the CS video call parameter pre-negotiation, the CS video call parameter pre-negotiation is performed, which makes the procedure more flexible and reasonable.

Figure 14:
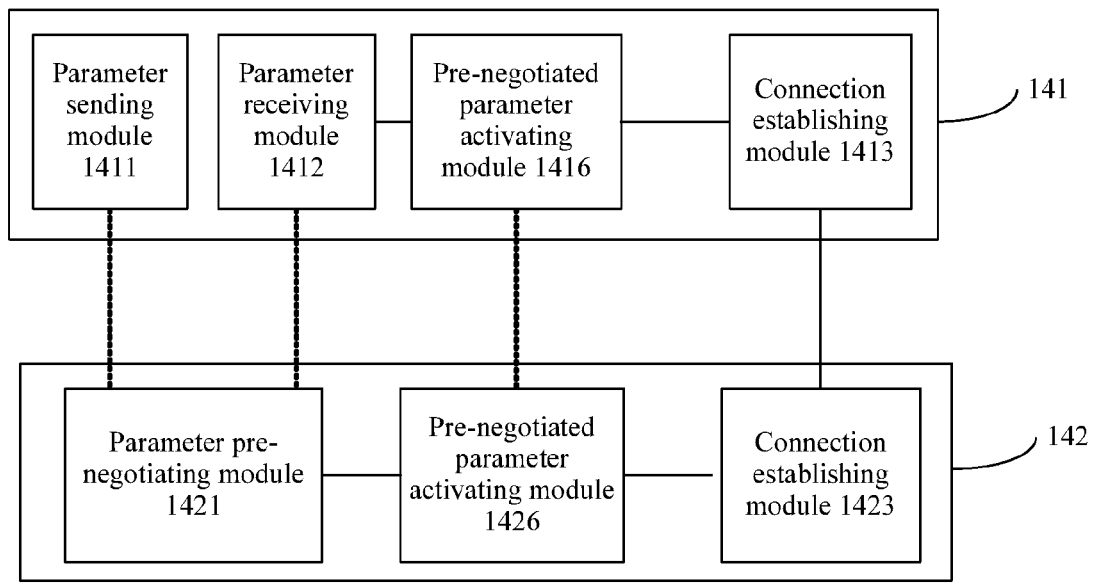
FIG. 14 is a structural diagram of another embodiment of a system for transferring a video call between access networks according to the present invention.

FIG. 14 is a structural diagram of another embodiment of a system for transferring a video call between access networks according to the present invention. As shown in FIG. 14, the system includes a terminal 141 and an MSC server 142. The terminal 141 includes a parameter sending module 1411, a parameter receiving module 1412, a pre-negotiated parameter activating module 1416, and a connection establishing module 1413, and the MSC server 142 includes a parameter pre-negotiating module 1421, a pre-negotiated parameter activating module 1426, and a connection establishing module 1423. For the parameter sending module 1411, the parameter receiving module 1412, and the connection establishing module 1413 in the terminal 141, and the parameter pre-negotiating module 1421 and the connection establishing module 1423 in the MSC server 142, reference may be made to the descriptions of corresponding modules in FIG. 10 to FIG. 13, and for conciseness, details are not repeatedly described here. The pre-negotiated parameter activating module 1416 is configured to, after a video call of the terminal is transferred to a CS domain, activate a pre-negotiated CS video call parameter received by the parameter receiving module 1412. The pre-negotiated parameter activating module 1426 is configured to, after the video call of the terminal is transferred to the CS domain, activate the pre-negotiated CS video call parameter determined by the parameter pre-negotiating module 1421.

Figure 15:
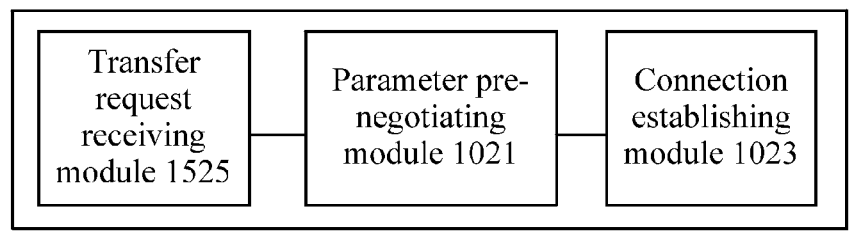
FIG. 15 is a structural diagram of an embodiment of an MSC server according to the present invention.

FIG. 15 is a structural diagram of an embodiment of an MSC server according to the present invention. As shown in FIG. 15, the MSC server includes a parameter pre-negotiating module 1021, a connection establishing module 1023, and a transfer request receiving module 1525. The transfer request receiving module 1525 receives a request message that is for handover from a PS domain to a CS domain and is sent by an MME, or receives a prepare handover response message sent by a target MSC; the parameter pre-negotiating module 1021 is specifically configured to: after the transfer request receiving module 1525 receives the request message for handover from the PS domain to the CS domain or receives the prepare handover response message, obtain, through IMS signaling, information that is of a terminal and is required for establishing a CS video call, perform CS video call parameter pre-negotiation to obtain a pre-negotiated CS video call parameter, and send the pre-negotiated CS video call parameter to the terminal.

For specific implementation of each module in the embodiments shown in FIG. 10 to FIG. 15, reference may be made to the descriptions of the embodiments shown in FIG. 1 to FIG. 9, and for conciseness, details are not repeatedly described here.

In the preceding several embodiments, each module is shown in a block diagram for illustration of its function. These functions may be implemented by using hardware, software, firmware, midware, a micro code, hardware description language, or any combination of them. For example, one or two function blocks may be implemented by using a code running on a microprocessor, a digital signal processor (DSP), or any other appropriate platform. The code may indicate any combination of a process, function, subprogram, program, routine program, subroutine program, module or instruction, data structure or program sentence. The code may be located in a computer readable medium. The computer readable medium may include one or more storage devices, for example, include a RAM memory, a Flash memory, a ROM memory, an EPROM memory, an EEPROM memory, a register, a hard disk, a mobile disk, a CD-ROM, or a storage medium of any other form known in the field. The computer readable medium may further include a carrier of an encoded data signal.

Optionally, or in addition, one or two function modules may be implemented by using an application specific integrated circuit (ASIC), a controller, a micro controller, a state machine, a field programmable gate array (FPGA) or other programmable logic components, a discrete gate or transistor logic, a discrete hardware component, or any combination of them.

Those skilled in the art are aware of replace ability of hardware, firmware, and software configured in these cases, and how to best implement the functions of each specific application.

The descriptions of the present invention are provided for exemplary and explanatory purposes, but do not exhaust or confine the present invention to the disclosed forms. Various modifications and variations are apparent to those of ordinary skill in the art. Selection and description of the embodiments are only for better illustration of the principles and actual applications of the present invention, and enable those of ordinary skill in the art to understand the present invention to design various embodiments that are with various modifications and applicable to specific purposes.

What is claimed is:

1. A method for transferring a video call between access networks, comprising:
    initiating, by an Internet Protocol (IP) multimedia subsystem (IMS) call establishment request message sent by a terminal in a packet switching (PS) domain, an IMS video call of the terminal, wherein the request message for initiating the IMS video call carries an indication that the terminal supports single radio video call continuity (vSRVCC) pre-negotiation;
    determining whether the terminal and a network side support a pre-negotiated circuit switching (CS) video call parameter;
    pre-negotiating the CS video call parameter in the PS domain through IMS signaling to obtain the pre-negotiated CS video call parameter when both the terminal and the network side are determined to support the pre-negotiated CS video call parameter; and
    establishing a CS video call according to the pre-negotiated CS video call parameter after a video call of a terminal is transferred from the PS domain to a CS domain.

2. The method according to claim 1, wherein pre-negotiating the CS video call parameter in the PS domain through the IMS signaling, comprises:
    obtaining, by a mobile switching center (MSC) server, information that is of the terminal and is required for establishing the CS video call;
    performing, according to the information that is of the terminal and is required for establishing the CS video call, the CS video call parameter pre-negotiation to obtain the pre-negotiated CS video call parameter; and
    sending the pre-negotiated CS video call parameter to the terminal.

3. The method according to claim 2, wherein obtaining, by the MSC server, the information that is of the terminal and is required for establishing the CS video call comprises:
    receiving, by the MSC server, the information that is of the terminal and is required for establishing the CS video call;
    sending, by a service centralization and continuity application server (SCC AS), the information that is of the terminal and is required for establishing the CS video call; and
    either obtaining from the terminal, after the IMS video call is established, the information that is of the terminal and is required for establishing the CS video call when requested by the SCC AS or obtaining the information that is of the terminal and is required for establishing the CS video call by sending the information from the terminal to the SCC AS, and
    wherein sending, by the MSC server, the pre-negotiated CS video call parameter to the terminal comprises sending, by the MSC server, the pre-negotiated CS video call parameter to the SCC AS such that the SCC AS sends the pre-negotiated CS video call parameter to the terminal.

4. The method according to claim 2, wherein obtaining, by the MSC server, the information that is of the terminal and is required for establishing the CS video call comprises requesting, by the MSC server and from the terminal, the information that is of the terminal and is required for establishing the CS video call after either the MSC server receives a request message that is for handover from the PS domain to the CS domain and the request message is sent by a mobility management entity (MME) or receives a prepare handover response message sent by a target MSC.

5. The method according to claim 2, wherein obtaining, by the MSC server, the information that is of the terminal and is required for establishing the CS video call comprises requesting, by the MSC server and from the terminal, the information that is of the terminal and is required for establishing the CS video call after the IMS video call is established, and wherein sending, by the MSC server, the pre-negotiated CS video call parameter to the terminal comprises sending, by the MSC server, the pre-negotiated CS video call parameter to the terminal.

6. The method according to claim 2, wherein obtaining, by the MSC server, the information that is of the terminal and is required for establishing the CS video call comprises receiving, by the MSC server, the information that is of the terminal and is required for establishing the CS video call, wherein the information that is of the terminal and is required for establishing the CS video call is sent by the terminal, and wherein the step of sending, by the MSC server, the pre-negotiated CS video call parameter to the terminal comprises sending, by the MSC server, the pre-negotiated CS video call parameter to the terminal.

7. The method according to claim 1, wherein the information that is of the terminal and is required for establishing the CS video call is carried in an IMS video call establishment request message initiated by the terminal in the PS domain.

8. The method according to claim 7, wherein obtaining, by the MSC server, the information that is of the terminal and is required for establishing the CS video call comprises:
  receiving, by the MSC server, the information that is of the terminal and is required for establishing the CS video call;
  sending, by a service centralization and continuity application server (SCC AS), the information that is of the terminal and is required for establishing the CS video call; and
  obtaining, by the SCC AS using the IMS video call establishment request message from the terminal, the information that is of the terminal and is required for establishing the CS video call,
  wherein sending, by the MSC server, the pre-negotiated CS video call parameter to the terminal comprises sending, by the MSC server, the pre-negotiated CS video call parameter to the SCC AS, and
  wherein the SCC AS sends the pre-negotiated CS video call parameter to the terminal.

9. The method according to claim 7, wherein obtaining, by the MSC server, the information that is of the terminal and is required for establishing the CS video call comprises obtaining, by the MSC server and from the IMS video call establishment request message, the information that is of the terminal and is required for establishing the CS video call.

10. The method according to claim 1, wherein establishing the CS video call according to the pre-negotiated CS video call parameter comprises:

activating, by a mobile switching center (MSC) and the terminal, the pre-negotiated CS video call parameter; and
establishing the CS video call for the terminal according to the pre-negotiated CS video call parameter.

11. A terminal, comprising:
a pre-negotiation indication sending module configured to carry, in a request message for initiating an Internet Protocol (IP) multimedia subsystem (IMS) video call establishment, an indication that the terminal supports single radio video call continuity (vSRVCC) pre-negotiation;
a pre-negotiation acknowledgment receiving module configured to receive, through an acknowledgment message of the IMS video call establishment, an acknowledgment that a network side supports the vSRVCC pre-negotiation;
a parameter sending module configured to, after the pre-negotiation acknowledgment receiving module receives the acknowledgment that the network side supports the vSRVCC pre-negotiation, send through an IMS signaling information that is of the terminal and is required for establishing a circuit switching (CS) video call when the terminal is in a packet switching (PS) domain;
a parameter receiving module configured to receive a pre-negotiated CS video call parameter through the IMS signaling when the terminal is in the PS domain; and
a connection establishing module configured to establish the CS video call for the terminal according to the pre-negotiated CS video call parameter after a video call of the terminal is transferred to a CS domain.

12. The terminal according to claim 11, wherein the parameter sending module is further configured to carry the information that is of the terminal and is required for establishing the CS video call in a request message for initiating IMS video call establishment when the video call of the terminal is in the PS domain.

13. The terminal according to claim 12, wherein the terminal further comprises a pre-negotiated parameter activating module configured to activate the pre-negotiated CS video call parameter received by the parameter receiving module after the video call of the terminal is transferred to the CS domain.

14. A mobile switching center (MSC) server, comprising:
a pre-negotiation indication receiving module configured to receive an indication that the terminal supports single radio video call continuity (vSRVCC) pre-negotiation, wherein the indication is carried in a request message for initiating Internet Protocol (IP) multimedia subsystem (IMS) video call establishment;
a pre-negotiation acknowledgment sending module configured to send, through an acknowledgment message of the IMS video call establishment, an acknowledgment that a network side supports the vSRVCC pre-negotiation;
a parameter pre-negotiating module configured to, after the pre-negotiation acknowledgment receiving module receives the acknowledgment that the network side supports the vSRVCC pre-negotiation:
  obtain, through an IMS signaling, information that is of the terminal and is required for establishing a circuit switching (CS) video call when a video call of a terminal is in a packet switching (PS) domain;
  perform CS video call parameter pre-negotiation to obtain a pre-negotiated CS video call parameter; and
  send the pre-negotiated CS video call parameter to the terminal; and a connection establishing module configured to establish the CS video call for the terminal according to the pre-negotiated CS video call parameter after the video call of the terminal is transferred to a CS domain.

15. The MSC server according to claim 14, wherein the parameter pre-negotiating module is further configured to receive, through a request message for initiating IMS video call establishment, the information that is of the terminal and is required for establishing the CS video call.

16. The MSC server according to claim 14, wherein the parameter pre-negotiating module is further configured to:
   obtain, through the IMS signaling and from a service centralization and continuity application server (SCC AS), the information that is of the terminal and is required for establishing the CS video call when the terminal is in the PS domain;
   perform the CS video call parameter pre-negotiation to obtain the pre-negotiated CS video call parameter; and
   send the pre-negotiated CS video call parameter through the SCC AS to the terminal.

17. The MSC server according to claim 14, further comprising a transfer request receiving module configured to either receive a request message that is for handover from the PS domain to the CS domain, and wherein the request message is sent by a mobility management entity (MME), or receive a prepare handover response message sent by a target MSC, wherein the parameter pre-negotiating module is further configured to:
   obtain, through the IMS signaling, the information that is of the terminal and is required for establishing the CS video call after either the transfer request receiving module receives the request message for handover from the PS domain to the CS domain or receives the prepare handover response message;
   perform the CS video call parameter pre-negotiation to obtain the pre-negotiated CS video call parameter; and
   send the pre-negotiated CS video call parameter to the terminal.

18. An application server, comprising:
   a parameter pre-negotiation indication receiving module configured to receive an indication that a terminal supports single radio video call continuity (vSRVCC) pre-negotiation, wherein the indication is carried in a request message for initiating Internet Protocol (IP) multimedia subsystem (IMS) video call establishment;
   a parameter pre-negotiation acknowledgment sending module configured to send, though an acknowledgment message of IMS video call establishment, the terminal an acknowledgment that a network side supports the vSRVCC pre-negotiation;
   a terminal parameter forwarding module configured to, after acknowledgment that the network side and the terminal support the vSRVCC pre-negotiation, obtain, through an IMS signaling, information that is of a terminal and is required for establishing a circuit switching (CS) video call, and forward the information to a mobile switching center (MSC) server; and
   a pre-negotiated parameter forwarding module configured to receive, through the IMS signaling, a pre-negotiated CS video call parameter from the MSC server, and forward the pre-negotiated CS video call parameter to the terminal.

19. The application server according to claim 18, wherein the terminal parameter forwarding module is configured to receive, through a request message that is sent by the terminal and used for initiating IMS video call establishment, the information that is of the terminal and is required for establishing the CS video call.

20. An Internet Protocol (IP) multimedia subsystem (IMS) system, comprising:
   a terminal, comprising:
      a pre-negotiation indication sending module configured to carry, in a request message for initiating an IMS video call establishment, an indication that the terminal supports single radio video call continuity (vSRVCC) pre-negotiation;
      a pre-negotiation acknowledgment receiving module configured to receive, through an acknowledgment message of the IMS video call establishment, an acknowledgment that a network side supports the vSRVCC pre-negotiation;
      a parameter sending module configured to, after the pre-negotiation acknowledgment receiving module receives the acknowledgment that the network side supports the vSRVCC pre-negotiation, send through an IMS signaling information that is of the terminal and is required for establishing a circuit switching (CS) video call when the terminal is in a packet switching (PS) domain;
      a parameter receiving module configured to receive a pre-negotiated CS video call parameter through the IMS signaling when the terminal is in the PS domain; and
      a connection establishing module configured to establish the CS video call for the terminal according to the pre-negotiated CS video call parameter after a video call of the terminal is transferred to a CS domain; and
   a mobile switching center (MSC) server, comprising:
      a pre-negotiation indication receiving module configured to receive the indication that the terminal supports vSRVCC pre-negotiation, wherein the indication is carried in a request message for initiating IMS video call establishment;
      a pre-negotiation acknowledgment sending module configured to send, through an acknowledgment message of the IMS video call establishment, an acknowledgment that a network side supports the vSRVCC pre-negotiation;
      a parameter pre-negotiating module configured to, after the pre-negotiation acknowledgment receiving module receives the acknowledgment that the network side supports the sRVCC pre-negotiation:
         obtain, through an IMS signaling, information that is of the terminal and is required for establishing a CS video call when a video call of a terminal is in the PS domain;
         perform CS video call parameter pre-negotiation to obtain a pre-negotiated CS video call parameter; and
         send the pre-negotiated CS video call parameter to the terminal; and
      a connection establishing module configured to establish the CS video call for the terminal according to the pre-negotiated CS video call parameter after the video call of the terminal is transferred to a CS domain.

21. The IMS system according to claim 20, wherein the IMS system further comprises:
   an application server, comprising:
      a parameter pre-negotiation indication receiving module configured to receive the indication that the terminal supports vSRVCC pre-negotiation, wherein the indication is carried in a request message for initiating IMS video call establishment;

a parameter pre-negotiation acknowledgment sending module configured to send, though an acknowledgment message of IMS video call establishment, the terminal an acknowledgment that a network side supports the vSRVCC pre-negotiation;

a terminal parameter forwarding module configured to, after acknowledgment that the network side and the terminal support the vSRVCC pre-negotiation, obtain, through an IMS signaling, information that is of a terminal and is required for establishing a CS video call, and forward the information to a mobile switching center MSC server; and a pre-negotiated parameter forwarding module configured to receive, through the IMS signaling, a pre-negotiated CS video call parameter from the MSC server, and forward the pre-negotiated CS video call parameter to the terminal.

\* \* \* \* \*

UNITED STATES PATENT AND TRADEMARK OFFICE
CERTIFICATE OF CORRECTION

PATENT NO. : 8,913,101 B2  
APPLICATION NO. : 13/731411  
DATED : December 16, 2014  
INVENTOR(S) : Hui Jin and Xiaoyan Duan Page 1 of 1

It is certified that error appears in the above-identified patent and that said Letters Patent is hereby corrected as shown below:

Title Page, Attorney, Agent, or Firm should read:

(74) Attorney, Agent, or Firm - Conley Rose P.C.; Grant Rodolph; Nicholas K. Beaulieu In the Claims Column 19 Lines 31, Claim 6 should read:

The method according to claim 2, wherein obtaining, by the MSC server, the information that is of the terminal and is required for establishing the CS video call comprises receiving, by the MSC server, the information that is of the terminal and is required for establishing the CS video call, wherein the information that is of the terminal and is required for establishing the CS video call is sent by the terminal, and wherein sending, by the MSC server, the pre-negotiated CS video call parameter to the terminal comprises sending, by the MSC server, the pre-negotiated CS video call parameter to the terminal.

Signed and Sealed this  
Thirtieth Day of June, 2015

Michelle K. Lee  
*Director of the United States Patent and Trademark Office*